(12) United States Patent
Adleman

(10) Patent No.: US 11,245,653 B2
(45) Date of Patent: Feb. 8, 2022

(54) METHODS AND SYSTEMS FOR CREATING AND USING MASSLESS CURRENCY

(71) Applicant: Elementum, LLC, Alexandria, VA (US)

(72) Inventor: Leonard M. Adleman, Northridge, CA (US)

(73) Assignee: ELEMENTUM, LLC, Alexandria, VA (US)

( * ) Notice: Subject to any disclaimer, the term of this patent is extended or adjusted under 35 U.S.C. 154(b) by 1093 days.

(21) Appl. No.: 14/526,136

(22) Filed: Oct. 28, 2014

(65) Prior Publication Data

US 2015/0193744 A1 Jul. 9, 2015

Related U.S. Application Data

(60) Provisional application No. 61/924,428, filed on Jan. 7, 2014.

(51) Int. Cl.
| | |
|---|---|
| *G06Q 20/06* | (2012.01) |
| *H04L 12/58* | (2006.01) |
| *G06Q 20/38* | (2012.01) |
| *H04L 9/30* | (2006.01) |
| *H04L 9/32* | (2006.01) |
| *H04L 29/06* | (2006.01) |

(Continued)

(52) U.S. Cl.
CPC .......... *H04L 51/12* (2013.01); *G06F 21/602* (2013.01); *G06Q 20/065* (2013.01); *G06Q 20/10* (2013.01); *G06Q 20/381* (2013.01); *G06Q 20/3829* (2013.01); *G06Q 20/401* (2013.01); *G06Q 30/0273* (2013.01); *G06Q 30/0277* (2013.01); *H04L 9/30* (2013.01); *H04L 9/3066* (2013.01); *H04L 9/3247* (2013.01); *H04L 63/0442* (2013.01); *H04L 63/061* (2013.01); *H04L 63/0876* (2013.01); *H04L 9/302* (2013.01)

(58) Field of Classification Search
CPC ........ G06F 17/60; G06Q 20/20; G06Q 10/00; G06Q 20/04; G06Q 40/02; H04L 9/00
USPC ...... 705/30, 37, 39, 41, 67, 77, 50, 51, 317; 713/155, 187

See application file for complete search history.

(56) References Cited

U.S. PATENT DOCUMENTS

| | | |
|---|---|---|
| 4,405,829 A | 9/1983 | Rivest et al. |
| 4,759,063 A | 7/1988 | Chaum |

(Continued)

OTHER PUBLICATIONS

Levy, E-Money (That's What I Want) dated Apr. 1, 2014, pp. 1-13, available at http://archive.wired.com/wired/archive/2.12/emoney_pr.html.

(Continued)

*Primary Examiner* — John W Hayes
*Assistant Examiner* — Sima Asgari
(74) *Attorney, Agent, or Firm* — Nixon & Vanderhye, PC

(57) ABSTRACT

Methods, systems, and computer-readable storage mediums are described for effecting practical use of a dual currency which is a currency that can be electronically created and stored, and further for which there is a secret key (e.g., the secret key of a public key/secret key pair as used in public key cryptography) such that: an entity that does not possess the secret key cannot, in practice, create notes of the currency; and an entity that does possess the secret key can, in practice, create notes of the currency without assistance from entities that do not possess the secret key.

10 Claims, 15 Drawing Sheets

(51) Int. Cl.
  *G06F 21/60* (2013.01)
  *G06Q 20/10* (2012.01)
  *G06Q 20/40* (2012.01)
  *G06Q 30/02* (2012.01)

(56) References Cited

U.S. PATENT DOCUMENTS

| | | | | |
|---|---|---|---|---|
| 7,567,909 | B1* | 7/2009 | Billingsley | G06Q 20/02 705/317 |
| 2001/0044786 | A1* | 11/2001 | Ishibashi | G06Q 20/04 705/77 |
| 2002/0032860 | A1* | 3/2002 | Wheeler | G06Q 20/00 713/170 |
| 2002/0111907 | A1* | 8/2002 | Ling | G06Q 20/04 705/41 |
| 2002/0169706 | A1* | 11/2002 | Chandra | G06Q 40/04 705/37 |
| 2002/0198827 | A1* | 12/2002 | van Leeuwen | G06Q 40/02 705/39 |
| 2003/0070080 | A1* | 4/2003 | Rosen | G06Q 20/02 713/187 |
| 2010/0224681 | A1* | 9/2010 | Triplett | G06Q 20/10 235/380 |
| 2014/0143142 | A1* | 5/2014 | Talker | G06Q 30/0641 705/41 |
| 2014/0337206 | A1* | 11/2014 | Talker | G06Q 20/0658 705/41 |

OTHER PUBLICATIONS

Adleman, Leonard M., "Time, Space and Randomness", MIT/LCS/TM-131, Mar.-Apr. 1979, available at http://www.usc.edu/molecularscience/timespacerand.pdf.
Wikipedia, "Cryptocurrency", http//en.wikipedia.org/wiki/Cryptocurrency, pp. 1-5, accessed on Oct. 20, 2014.
Adleman, Leonard M,. "The Rarest Things in the Universe", Azimuth, Online Guest Post dated Jan. 27, 2014, available at http://johncarlosbaez.wordpress.com/2014/01/27/the.rarest-things-in-the-universe/, pp. 1-4.
Wikipedia, "Diffie-Hellman key exchange", http://en.wikipedia.org/wiki/Diffie-Hellman_key_exchange, accessed on Oct. 20, 2014.
Wikipedia, "Secret Sharing", http://en.wikipedia.org/wiki/Secret_sharing, accessed on Oct. 20, 2014.
Bellovin, Rebecca, "Cryptography: Authentication, Blind Signatures, and Digital Cash", available online at http://math.stanford.edu/~rmbellov/writings/chaum.pdf, accessed Oct. 20, 2014.
Wikipedia, "Bitcoin", http://simple.wikipedia.org/wiki/Bitcoin, accessed Oct. 20, 2014.
Encryptek,"Radium PCIe Card", http:// http://www.encryptek.net/radium_pcie_card.html, accessed on Oct. 20, 2014.
Rivest et al., "A Method for Obtaining Digital Signatures and Public-Key Cryptosystems", pp. 1-15.
Childers, "Factorization of a 1061-bit number by the Special Number Field Sieve," Cryptology ePrint Archive, Report 2012/444, 2012, http://eprint.iacr.org/.

* cited by examiner

METHODS AND SYSTEMS FOR CREATING AND USING MASSLESS CURRENCY

CROSS-REFERENCE TO RELATED APPLICATION

This application claims the benefit of U.S. Provisional Patent Application No. 61/924,428 filed on Jan. 7, 2014, which is hereby incorporated by reference in its entirety.

TECHNICAL FIELD

The subject matter below relates generally to specially configured computing machines, systems of specially configured inter-communicating computing machines and specially configured computing machine-implemented processes capable of effecting the practical use of massless currencies that can be used with a high degree of security, efficiency, usability and the like, as a medium of exchange in transactions involving goods and/or services in the real world (e.g., physical goods) as well as goods and/or services in the electronic domain (e.g. digital music), for barter, for monetary exchange, for commercial transactions, and the like. More particularly, the subject matter relates to specially configured computing machines capable of effecting practical use of a dual currency which is a currency that can be electronically created and stored, and further for which there is a secret key (e.g., the secret key of a public key/secret key pair as used in public key cryptography) such that: an entity that does not possess the secret key cannot, in practice, create notes of the currency; and an entity that does possess the secret key can, in practice, create notes of the currency without assistance from entities that do not possess the secret key.

BACKGROUND

Massless currencies (also sometimes called virtual currencies, electronic currencies or digital currencies), such as, Bitcoin® and Bitcoin®-like currencies have been in use as a medium of exchange for a few years. Although used by some to conduct transactions, many conventional massless currencies are not widely accepted because they lack one or more property necessary to increase their adoption for a wider range of transactions by larger numbers of people, by larger numbers of commercial entities, by government agencies, and by governments as fiat currency.

Thus, a massless currency which has many of the properties of the massless currencies currently in use, and, in addition, has further properties, for example of fiat currency, may be more widely accepted and/or adopted than massless currencies that are currently in use.

DETAILED DESCRIPTION

Figure 1:
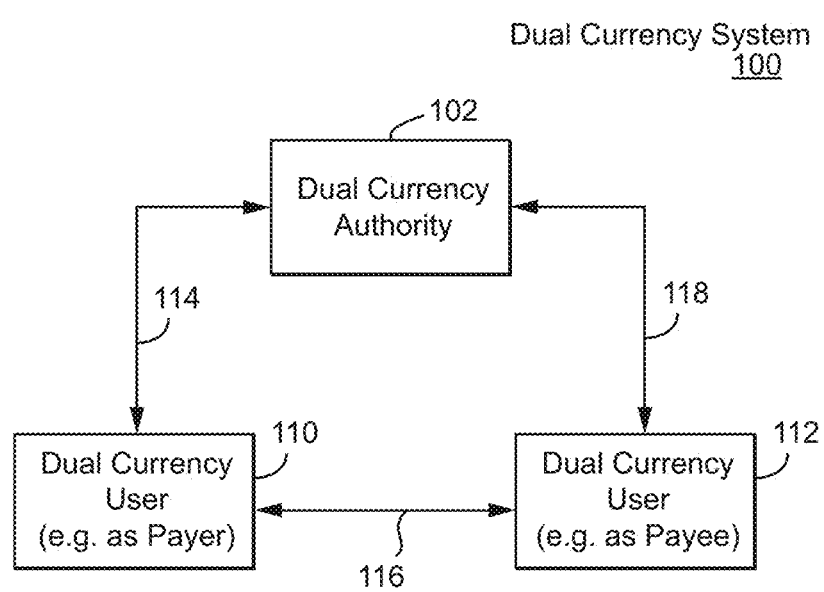
FIG. 1 is a high-level block diagram of a dual currency system of specially configured inter-communicating computing devices, in accordance with some embodiments.

The term "massless currency," as used herein, refers to a currency that can be electronically created, stored, and exchanged. The term "currency" refers to a medium of exchange usable for transferring value (e.g. money, stocks, stamps, checks, coupons, and documents (e.g. loan documents, documents of ownership)) from one entity to another. A massless currency can be used as a medium of exchange in transactions involving goods and/or services in the real world (e.g., physical goods) as well as goods and/or services in the electronic domain (e.g. digital music).

A massless currency that has many of the desirable properties of a fiat currency such as the U.S. Dollar may be highly desirable. For example, it may be desirable that a massless currency is such that a properly authorized entity can add new notes to or remove existing notes from circulation without incurring a prohibitive cost so that a proper supply of the currency is available (e.g. similar to the U.S. Dollar), and also is such that counterfeiting of notes, either by creating a new note without authority to do so (called denovo counterfeiting) or by copying a note created by the properly authorized entity (called duplication counterfeiting), incurs a prohibitively high cost on the counterfeiter (e.g. similar to the U.S. Dollar where notes are designed with features that make the production of convincing counterfeits very costly and make it very difficult to produce convincing copies of authentic notes with available technology).

The term "dual currency" as used herein is hereby defined to mean: a currency that can be electronically created, stored, and exchanged and further for which there is a secret key such that the following two conditions are satisfied: (1) An entity that does possess the secret key creates notes of the currency by generating data strings of a predefined structure and encrypting them with the secret key; and (2) An entity that does not possess the secret key cannot, in practice, create notes of the currency.

As used herein, a "dual currency note" or simply "note" is a note of the dual currency. A "dual currency authority" or simply "authority" is an entity that does possess the secret key. A "dual currency note content" or simply "content" is a data string with the predefined structure which may subsequently be encrypted with the secret key to create a dual currency note. A "dual currency user" or simply "user" is an entity that uses dual currency notes.

Condition (1) requires that a dual currency authority (i.e. an entity that does possess the secret key) can, in practice, generate a dual currency note content and encrypt the dual currency note content with the secret key to create a dual currency note. Thus, a dual currency authority, for example, a government and/or central bank, can create new dual currency notes of the dual currency at its sole discretion (e.g. to increase the money supply) without assistance from entities that do not possess the secret key. In particular, the predefined structure required of a dual currency note content must be such that the dual currency authority can, in practice, produce data strings with this predefined structure and can, in practice, distinguish data strings with this predefined structure from those that do not have this predefined structure. Further the dual currency authority can, in practice, encrypt a dual currency note content with the secret key, thus producing a dual currency note. A non-limiting example of a dual currency would be one with the dual currency note content predefined structure shown in FIG. 4 item 402 and which uses 2048-bit RSA public key cryptography keys. The dual currency authority may, using standard computational methods, in practice, produce data strings with the predefined structure and may, using standard computational methods, in practice, distinguish data strings with this predefined structure from those that do not have this predefined structure. The cost in time and money for the dual currency authority to encrypt a dual currency note content with the secret key, thus producing a dual currency note, is the same as to perform a single encryption with a 2048-bit RSA system. The company Encryptek currently sells its Radium PCIe Card for approximately $38,000. The card is advertised to perform 45,000 such encryptions per second (3,888,000,000 per day) (e.g. see http://www.encryptek.net/products.html.)

Condition (2) requires that an entity that does not possess the secret key cannot, in practice, create a dual currency note. For example, if the creation of a dual currency note by an entity that does not possess the secret key is theoretically not impossible, but would require far too many resources and/or time in terms of current technology, then the creation of a dual currency note cannot be done in practice. A non-limiting example of a dual currency uses 2048-bit RSA (Rivest Shamir Adleman) public key cryptography keys. The best method known to attempt to create a note of the dual currency without the secret key is to break the 2048-bit RSA system. It is estimated that standard desktop computing power would take "a little over 6.4 quadrillion years" (6,400,000,000,000,000 years) to break a 2048-bit RSA-encoded certificate (e.g., see "The Math Behind Estimations to Break a 2048-bit Certificate," at http://www.digicert.com/TimeTravel/math.htm).

FIG. 1 is a high-level block diagram of a dual currency system 100, in accordance with one or more first embodiments. Dual currency system 100 includes a dual currency authority 102 and dual currency users 110 and 112 that interact in order to perform transactions, such as, for example, purchasing and paying for goods or services.

Dual currency authority 102 operates to control the supply and distribution of the dual currency. Authority 102 may perform the functions of generating and managing secret and non-secret keys, creating and destroying dual currency notes, transferring dual currency notes from the authority 102 to users 110 and/or 112 and transferring the value of dual currency notes between users 110 and 112. All unique notes of the dual currency are based upon a secret key known preferably only to authority 102. Authority 102 may perform creation of dual currency notes autonomously and requires no interaction with users 110 or 112 or other entities to do so. The dual currency authority may be paid for performing functions or it may do them without pay.

User 110 may operate as a payer and user 112 may operate as a payee. For example, dual currency authority 102 may create dual currency notes and distribute them to user 110, who may use them to pay for goods, information or services purchased from user 112 operating as a payee.

In an embodiment, user 110 operating as a payer may be used by a smartphone or computer, an individual user shopping online and user 112 may be an online shopping portal operating as a payee. In example embodiments, user 112 operating as a payee may include any entity that electronically accepts payments, and user 110 operating as a payer may include any entity that makes electronic payments. It will be understood that "payer" and "payee" are roles assumed by a dual currency user's device(s) for a transaction, and that the same user device(s) can operate as a payee for one transaction and as a payer for another transaction.

Network connections 114 and 118 provide, respectively, for transferring dual currency notes and associated messages between authority 102 and user 110, and between authority 102 and user 112. Network connection 116 provides for the exchange of messages between users 110 and 112, For example network connection 116 may provide for the display of an online-shopping portal web page maintained by user 110 and the interactions with that online-shopping portal web page by user 112. In some embodiments, network connection 116 may also be used for transferring dual currency notes between user 110 and user 112.

Figure 2A:
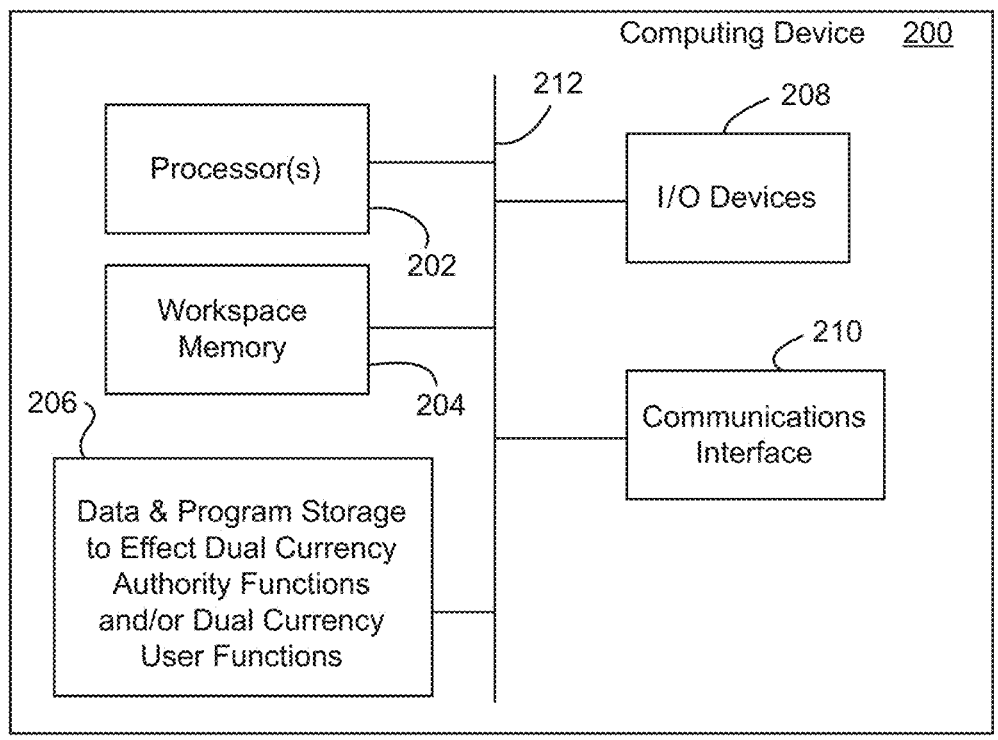
FIGS. 2A and 2B are high-level block diagrams of inter-communicating computing devices which are specially configured to operate as a dual currency authority, an issuer, a mint, a user (e.g. as payee or payer) in a dual currency system, according to some embodiments.
Figure 2B:
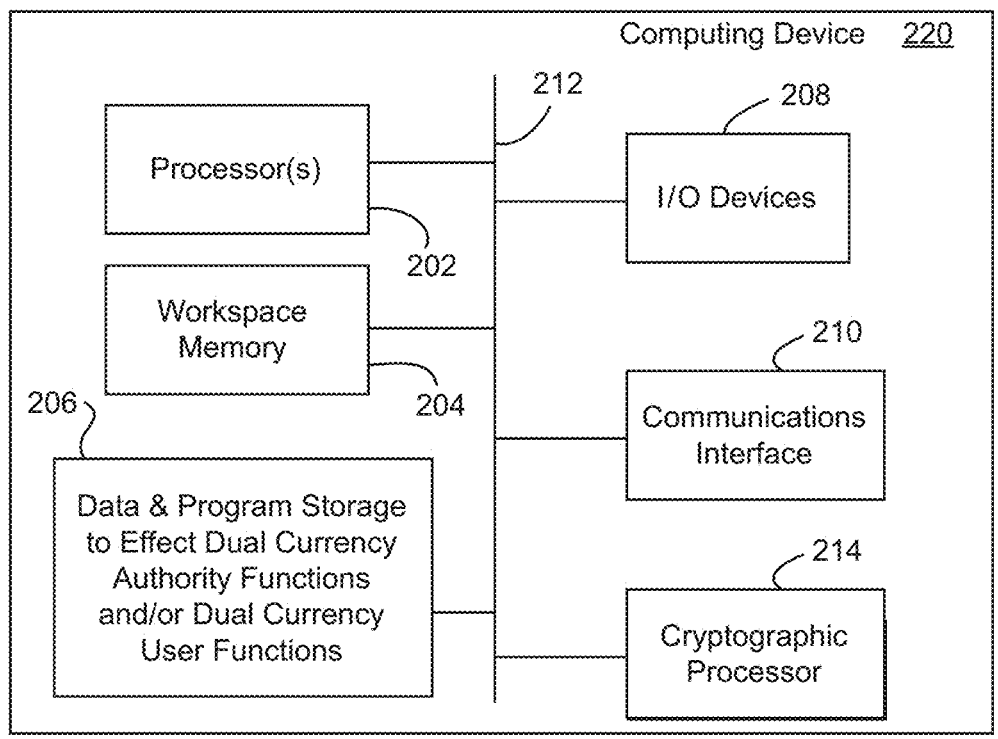

Each of the entities, dual currency authority 102, user 110, and user 112, includes one or more specially configured computer device processing systems including, for example, at least one computing device, such as computer 200 illustrated in FIG. 2A or computer system 220 illustrated in FIG. 2B. Computer 200, further described below, is a simplified block diagram of a general purpose computer which can be configured (e.g., with stored executable computer program code structures accessible for execution by a central processing unit and/or hardware components such as programmable gate arrays, application specific integrated circuits or ASICs and the like) in order to operate as one or more of authority 102, user 110 (e.g. operating as payer), and user 112 (e.g. operating as payee). Communication connections 114, 116, and 118, may be provided by any combination of electronic communication mediums, such as, for example, local area networks, point to point connections, wide area networks, internet, wireless networks, wired networks, etc. As those in the art will appreciate, the network connections 114, 116, 118 may all be effected via the publically accessible internet.

FIG. 2A is a high-level block diagram of computing device 200, and includes one or more processors 202 (e.g., a CPU), work-space volatile memory 204, non-volatile data and program storage 206 configured to store executable program code structures configured to effect dual currency authority, user (e.g. as payer, as payee) functions and the like, input/output devices 208 (e.g., touch-sensitive display screen, mouse, keyboard, visual display, and the like), and network communications interface 210 (e.g., network interface card). A communication infrastructure 212 (e.g., an internal bus of the computing device) interconnects the one or more processors 202, memory 204, storage 206, input/output devices 208, and network interface 210.

The one or more processors 202 may include one or more of central processing units, specialized cryptographic processors, ASICs, FPGAs, or any other type of logic circuitry capable of executing predetermined specially configured sets of structured instructions. Work space memory 204 includes random access memory (RAM) or any other volatile memory, and data and program storage 206 includes any non-volatile memory (e.g., magnetic disk, FLASH, etc). Data and/or programs may be stored in storage 206. Data and/or programs may temporarily reside in volatile memory 204 when, for example, a particular program code structure is being executed by processor 202. I/O devices 208 may include one or more displays, keyboards, mouse, etc. Communication interface 210 may include one or more of network interfaces, such as, wireless network interfaces (e.g., WIFI, Bluetooth, Near Field Communications (NFC)), and/or wired network interfaces (e.g., Ethernet).

Figure 3:
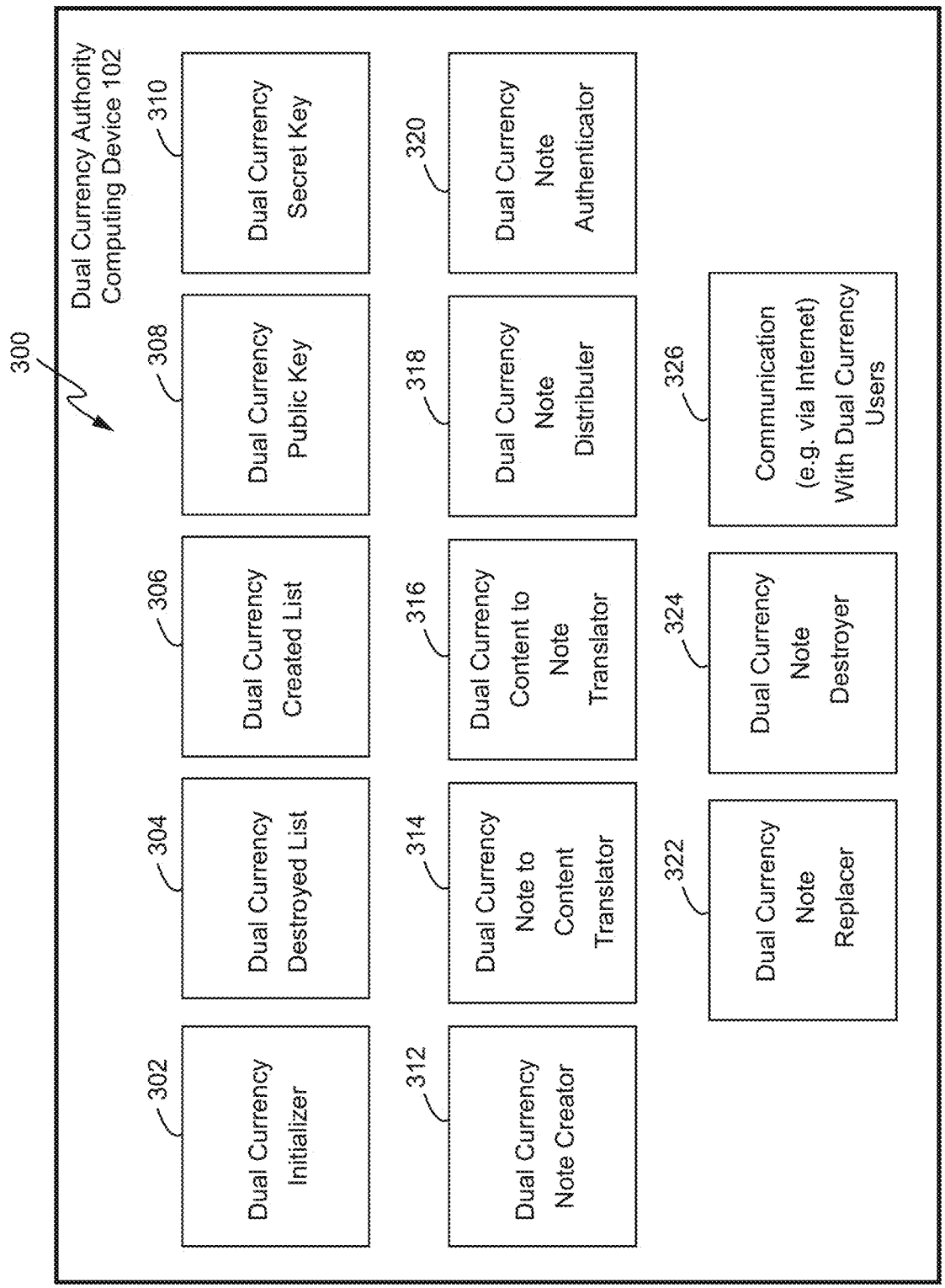
FIG. 3 illustrates some components of a specially configured computing system that is associated with a dual currency authority, in accordance with one or more embodiments.

FIG. 2B is a high-level block diagram of another computing device according to some embodiments. Computing device 220, like computing device 200, includes one or more processors 202, work-space volatile memory 204, non-volatile data and program storage 206 configured to store executable program code structures configured to effect dual currency authority, user (e.g. as payer, as payee) functions and the like, input/output devices 208, network communications interface 210, and communication infrastructure 212. Additionally, computing device 220 includes one or more special processors 214, such as, but not limited to, a cryptographic processor, that is connected via the communication infrastructure 212. According to an embodiment, special processor 214 may include an RSA public key acceleration system including PCI express card hardware and associated software (e.g. Radium PCIe) sold by Encryptek of California, USA FIG. 3 illustrates some system components 300 of a dual currency authority 102 according to one or more first embodiments. For example, some or all system components 300 (e.g., functional modules implemented with computer program instructions executed by a computer processor or with ASICs, FPGA or the like) may be included in one or more servers or other computers, such as, for example, computer 200 or computer 220, operating as a dual currency authority 102. The system components 300 include a dual currency initializer 302, a dual currency destroyed note list 304, a dual currency created note list 306, a dual currency public key 308, a dual currency secret key 310, a dual currency note creator 312, a dual currency note to content translator 314, a dual currency content to note translator 316, a dual currency note distributor 318, a dual currency note authenticator 320, a dual currency note replacer 322, a dual currency note destroyer 324, and communication interfaces 326 for communicating with dual currency users.

Figure 6:
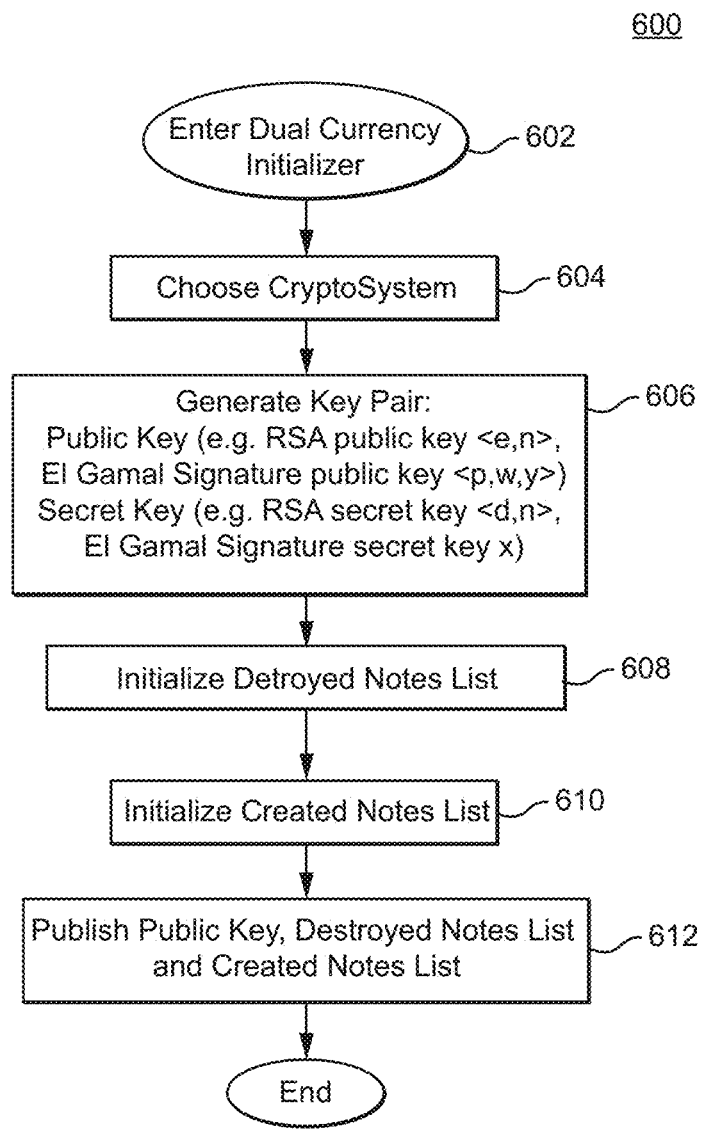
FIG. 6 is a flowchart illustrating a machine-implemented method for initializing a dual currency system, in accordance with one or more embodiments.

The dual currency note initializer 302 operates to initialize the dual currency system, and may include the generation (or acquisition through some other means) of a public key and a secret key for use in association with the dual currency, and the initialization of various system components. An example dual currency initializer process is shown in FIG. 6.

The dual currency destroyed note list (referred to also as "destroyed list") 304 lists the dual currency note content of dual currency notes that have been destroyed by the authority. The dual currency destroyed note list is, according to some embodiments, public and allows users to identify dual currency notes that have been destroyed by the authority. Placing the dual currency note content of a dual currency note onto the destroyed list in some ways corresponds to the removal of a US dollar bill from circulation in the dollar currency environment—i.e. that particular bill, typically identified by a serial number in the case of a US dollar bill, is no longer valid as currency. In some embodiments, the dual currency destroyed note list may list dual currency notes that have been destroyed by the authority rather than their dual currency note contents; however a list with dual currency notes may be a more attractive target for attack than a list with dual currency note contents.

The dual currency created note list (referred to also as "created list") 306 lists the dual currency note content of dual currency notes that have been created by the authority. The dual currency created note list is, according to some embodiments, public and allows users to identify dual currency notes that have been created by the authority. Placing the dual currency note content of a dual currency note onto the created list in some ways corresponds to the addition of a US dollar bill into circulation in the dollar currency environment—i.e. that particular bill, typically identified by a serial number in the case of a US dollar bill, is valid as currency (unless and until that U.S. Dollar is subsequently destroyed). In some embodiments, the dual currency created list may list dual currency notes that have been created by the authority rather than their dual currency note contents; however a list with dual currency notes may be a more attractive target for attack than a list with dual currency note contents.

In some embodiments, the destroyed list and/or the created list are time-varying lists. In some embodiments, the destroyed list and/or the created list are made available (e.g. over the internet) to users in a timely fashion. In some embodiments, the destroyed list and/or the created list are not made available to users. In some embodiments, the created list may be omitted. For example, when the authority, rather than authenticating a purported note by checking the created list, authenticates a purported note by applying the public key to the purported note and confirms that the result has the required structure. In some embodiments there may be lists other than the created and destroyed lists. For example, a list of recently created, but not distributed, dual currency notes may operate as a reservoir to be tapped when, for example, transaction traffic or other conditions, such as power, communications or machine failure, keep the dual currency authority from creating dual currency notes in a timely fashion.

The dual currency public key 308 and dual currency secret key 310 are in some embodiments respectively the public key and the secret key data structures produced according to a public key cryptosystem, such as, but not limited to, the RSA (Rivest Shamir Adleman) public key cryptosystem. The dual currency public key 308 and dual currency secret key 310 are in some embodiments respectively the public key and the secret key data structures produced according to a signature scheme, such as, but not limited to, the El Gamal signature scheme.

Figure 8:
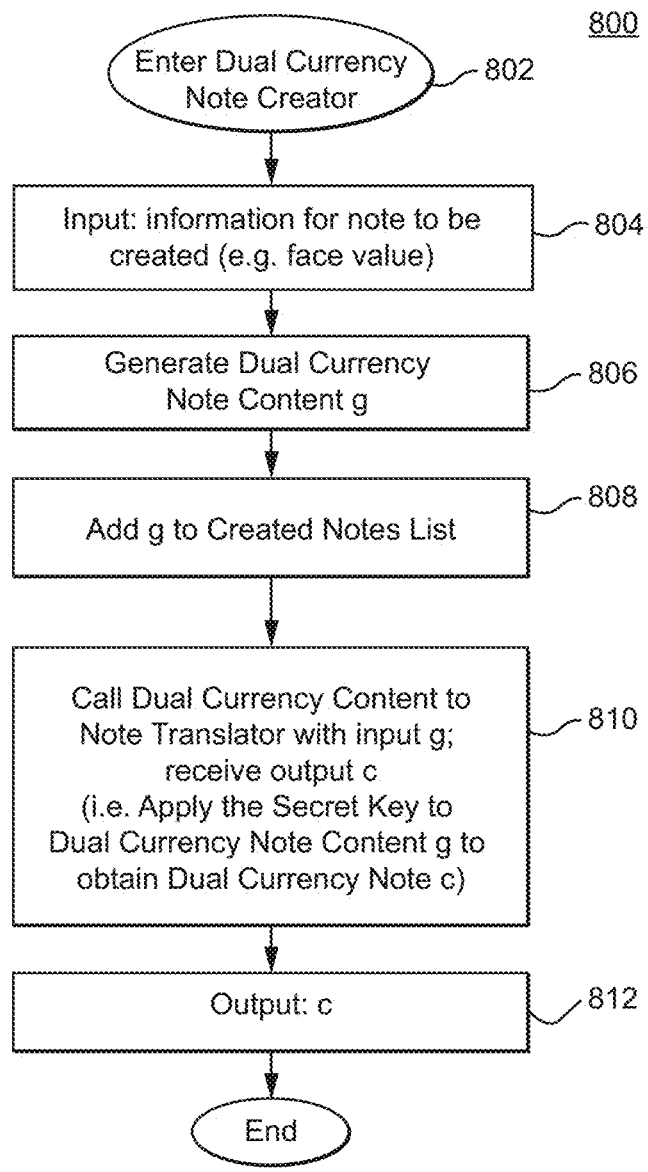
FIG. 8 is a flowchart illustrating a machine-implemented method for creating a dual currency note in the dual currency, in accordance with one or more embodiments.

Dual currency note creator 312 operates to create dual currency notes. For example, dual currency note creator 312 may take as input data describing a dual currency note content or a dual currency note content itself and, after processing, the dual currency note creator 312 may output a corresponding dual currency note. An example dual currency note creator process is shown in FIG. 8.

Figure 7A:
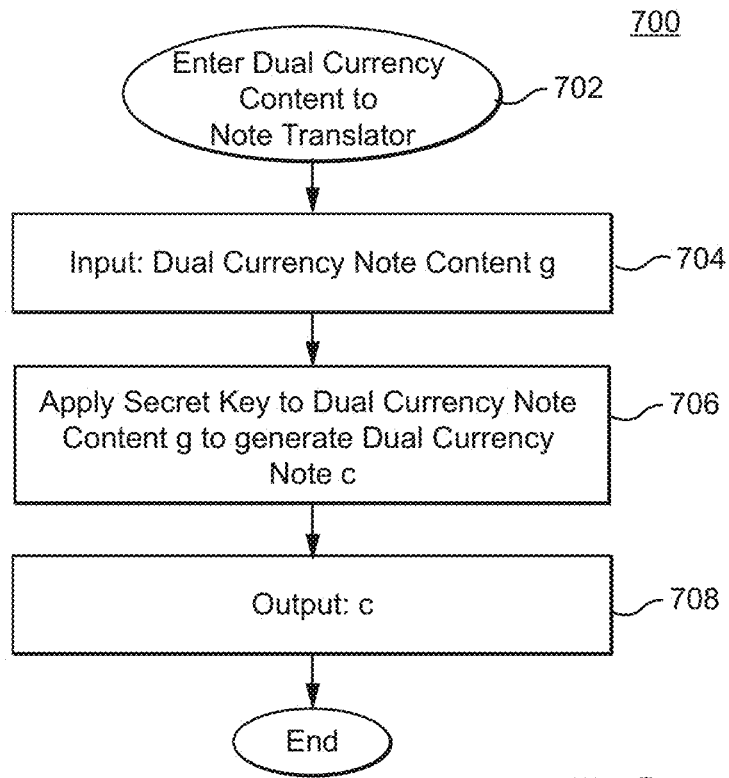
FIG. 7A is a flowchart illustrating a machine-implemented method for translating a dual currency note content to the corresponding dual currency note.
Figure 7B:
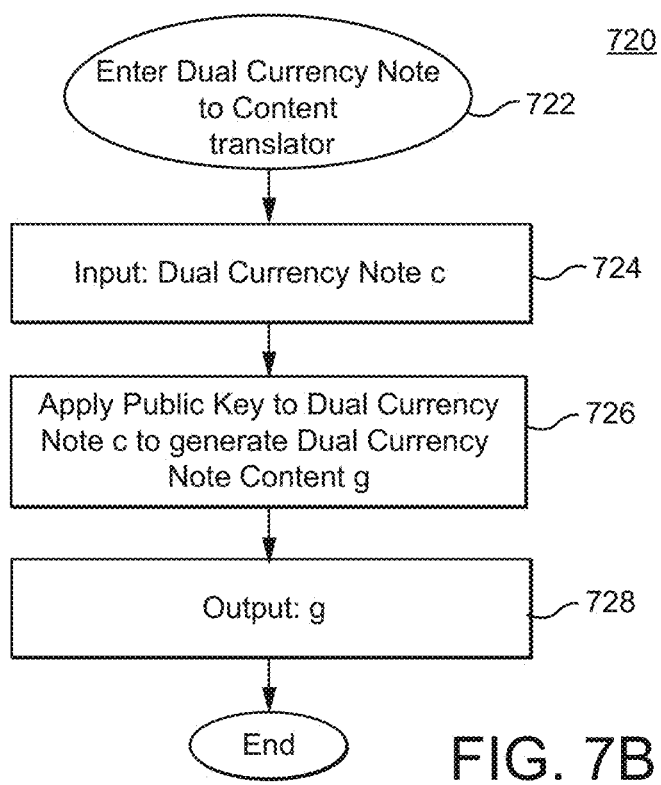
FIG. 7B is a flowchart illustrating a machine-implemented method for translating a dual currency note to the corresponding dual currency note content.

Dual currency note to content translator 314 operates to translate a dual currency note to its corresponding dual currency note content, and the dual currency note content to note translator 316 operates to translate a dual currency note content to its corresponding dual currency note. An example dual currency note to content translator process is shown in FIG. 7B, and an example dual currency content to note translator process is shown in FIG. 7A.

Figure 10:
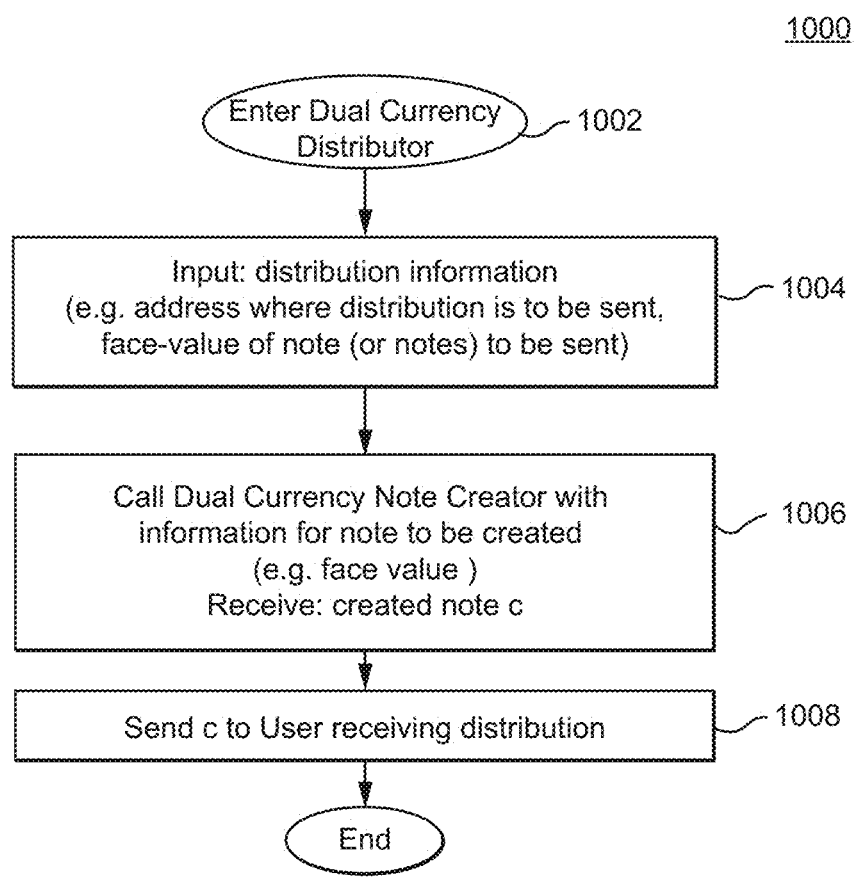
FIG. 10 is a flowchart illustrating a machine-implemented method for distributing dual currency notes, in accordance with one or more embodiments.

Dual currency note distributor 318 operates to distribute dual currency notes from the dual currency authority to dual currency users. For example, the dual currency authority may be set up to send employees their salaries in the form of dual currency notes. An example note distribution process is shown in FIG. 10.

Dual currency note authenticator 320 operates to take an input (e.g. a dual currency note, or a string proffered as a possible dual currency note) and determine whether the input is an authentic dual currency note (i.e. a dual currency note which has been created by the authority and has not been destroyed by the authority) or the input is not an authentic dual currency note (i.e. an input that is not a dual currency note which has been created by the authority, or an input which is a dual currency note which has been created by the authority, but has subsequently been destroyed by the authority). In particular, by this definition of authentic dual currency note, starting with an authentic dual currency note and subsequently modified some of its bits, will not result in an authentic dual currency note because the modified note was not created by the authority.

An input determined to be authentic is seen by the authority as having value. An input determined to be not authentic is seen by the authority to have no value and to be the product of a possible counterfeit attempt. An example dual currency authenticator process is described below in relation to FIG. 11.

In some embodiments where the destroyed list and created list, list notes themselves, dual currency note authenticator 320 determines whether the input is on the created list and whether the input is not on the destroyed list. If the input is on the created list and not on the destroyed list, then the input is declared to be authentic; otherwise not authentic. In some embodiments where the destroyed list and created list, list the note content of notes, dual currency note authenticator 320 may call the dual currency note to content translator 314 with the input and takes the output of the dual currency note to content translator 314 and determines whether the output is on the created list and whether the output is not on the destroyed list. If the output is on the created list and the output is not on the destroyed list, then the input is declared to be authentic; otherwise not authentic.

Figure 12A:
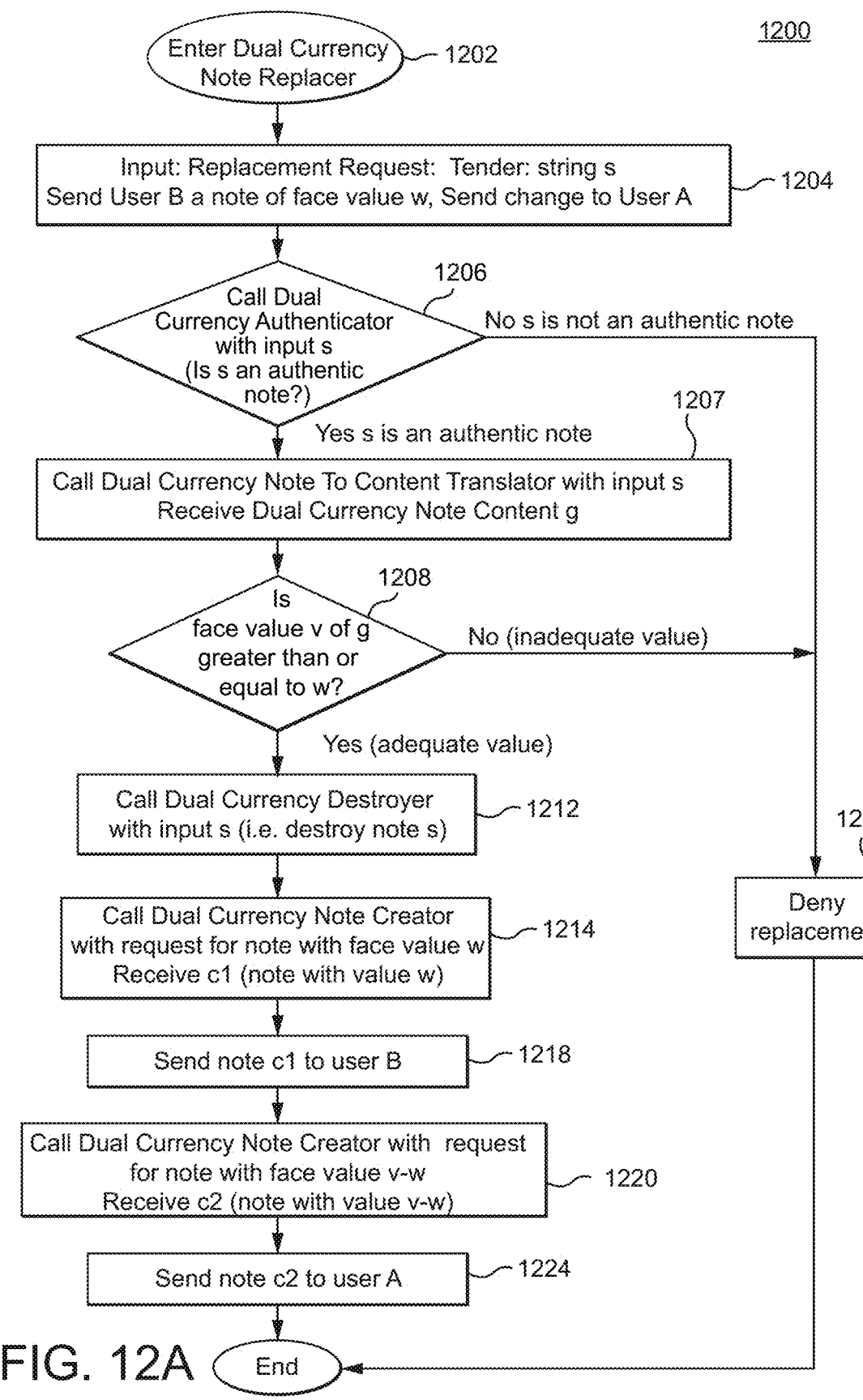
FIG. 12A is a flowchart illustrating a machine-implemented method for replacing dual currency note, in accordance with one or more embodiments.
Figure 12B:
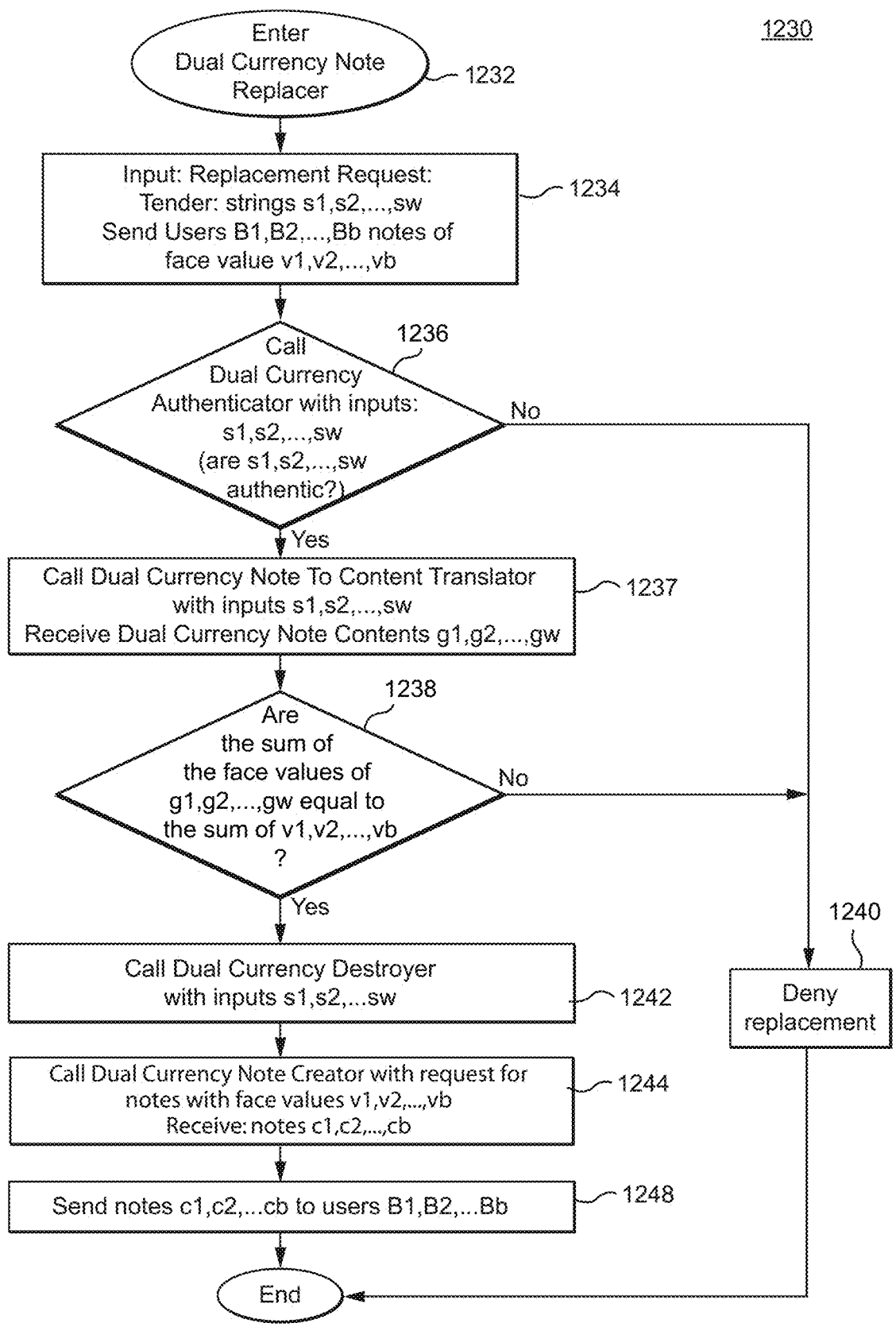
FIG. 12B is a flowchart illustrating a method for replacing a plurality of dual currency notes, in accordance with one or more embodiments.

Dual currency note replacer 322 operates to take one or more authentic dual currency notes from a user (e.g. operating as a payer) or users (e.g. operating as payers) as input, destroy them, create one or more new dual currency notes and send them to a user (e.g. operating as payee) or users (e.g. operating as payees) as output. Because a dual currency note received from the authority during a dual currency note replacement is newly created and has never been outside of the control of the authority, the user receiving that note is assured that the note being received is not counterfeit (e.g. not a denovo counterfeit and not a duplication counterfeit). For example, a merchant receiving payment from a customer using the dual currency note replacer knows that he has not accepted a counterfeit. Example dual currency note replacer processes are shown in FIG. 12A and FIG. 12B.

Figure 9:
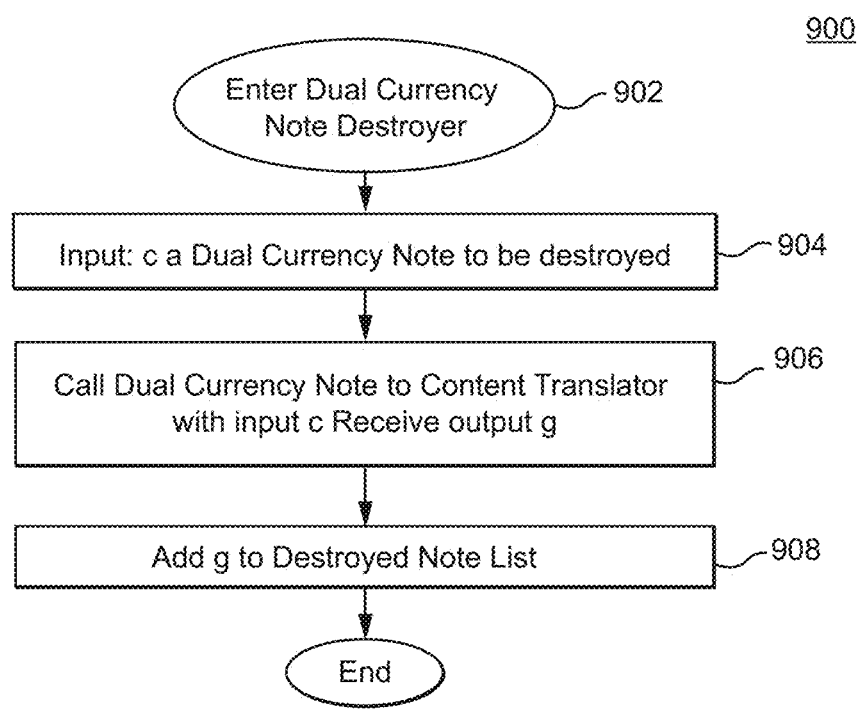
FIG. 9 is a flowchart illustrating a machine-implemented method for destroying a dual currency note, in accordance with one or more embodiments.

Dual currency note destroyer 324 operates to receive a dual currency note as input and to remove that note from circulation. In some embodiments where the destroyed list lists notes themselves, 324 adds the received dual currency note to the destroyed list. In some embodiments where the destroyed list lists the note content of notes, 324 calls the dual currency note to content translator with the input and takes the output and adds the output to the destroyed list. An example dual currency note destroyer process is shown in FIG. 9.

Communication interfaces 326 provide for communications between dual currency authority 102 and dual currency users 110 and 112. The communication may be over a network such as, for example, the Internet.

Figure 4:
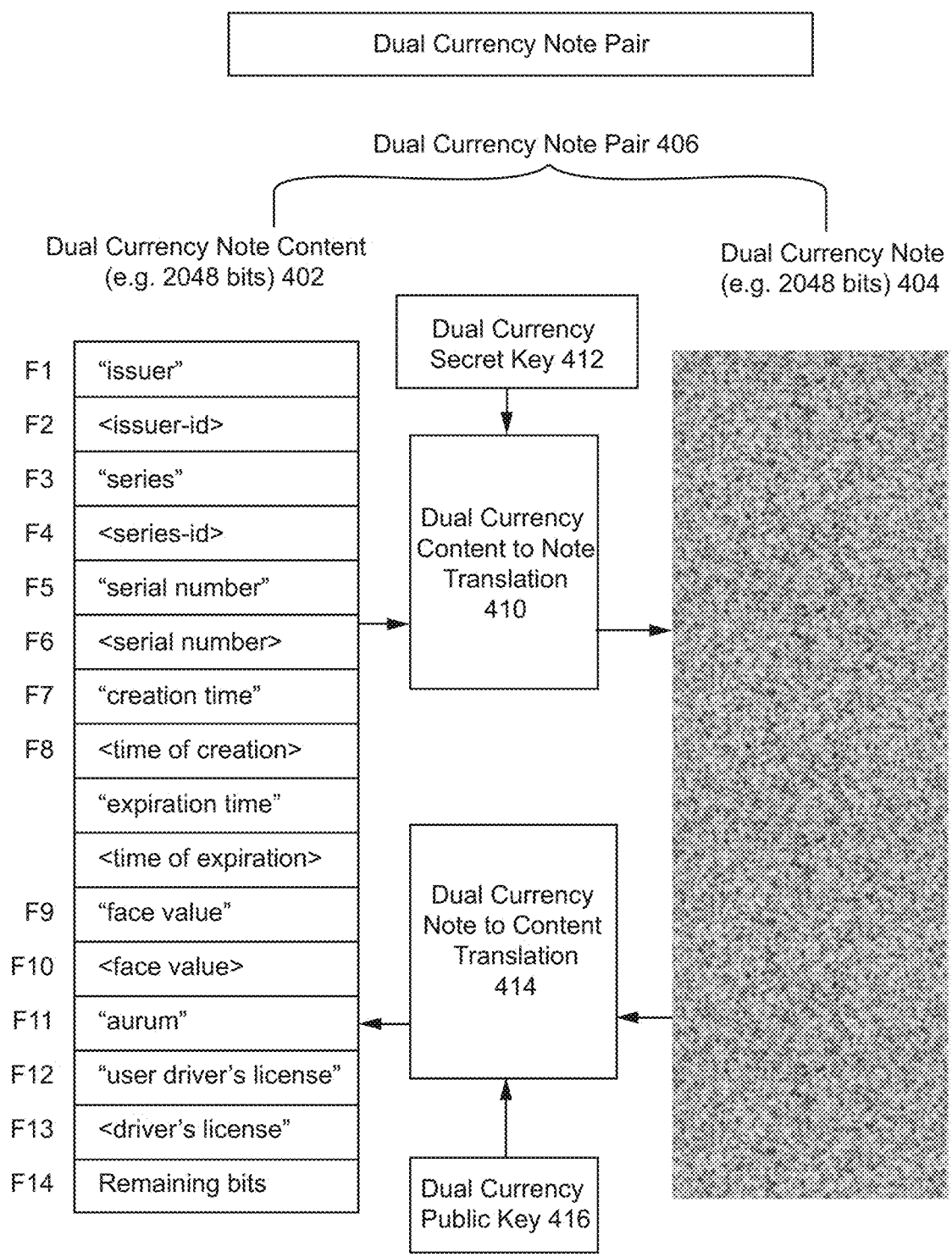
FIG. 4 illustrates a dual currency note pair consisting of a dual currency note and a dual currency note content, according to one or more embodiments.

FIG. 4 illustrates an example dual currency note data structure and dual currency note content data structure, according to some embodiments. Dual currency note content 402 may be a 2048-bit string generated so that certain (e.g. predetermined) structural properties are satisfied. For example, the shown bit-string has certain fixed fields ((e.g. encoded in ASCII): "issuer", "series", "serial number", "creation time", "expiration time", "face value", "aurum", "user's driver license") and certain variable fields with values in certain ranges.

An example 2048-bit dual currency note content 402 may be encoded with fields F1-F14 such that: F1 is a fixed-size field encoding 'issuer' in ASCII; F2 is a variable-size field identifying the issuer, e.g., 'USBank' in ASCII; F3 is a fixed-field that encodes 'series' in ASCII; F4 is a variable-field identifying the series of this content data, e.g., '00000117' in ASCII; F5 is a fixed-field that encodes 'serial number' in ASCII; F6 is a variable-field identifying the serial number of this dual currency note content, e.g., '82377981' in binary; F7 is a fixed-field that encodes 'creation time' in ASCII; F8 is a variable field which identifies the time (e.g., to a millionth of a second) the dual currency note content was created, e.g., '201403160130.001011' in ASCII; F9 is a fixed field that encodes 'face value' in ASCII; F10 is a variable field identifying the face value of the content data, e.g. '13620.3452' in ASCII (i.e. thirteen thousand six hundred and twenty and 3452/10000); F11 is a fixed field that encodes 'Aurum' (e.g. 'Aurum' may be the identity of the dual currency authority) in ASCII; F12 is a fixed field that encodes 'user's driver's license' in ASCII; F13 is a variable field that identifies the driver's license number of the user for whom the dual currency note content is created, e.g. A1246810 in ASCII; F14 includes the remaining bits of the string and may consist of fixed fields, variable fields, and/or random fields. As depicted in FIG. 4, field F8 may be expanded to include bits specifying an expiration time and/or the time of expiration.

It will be appreciated that the illustrated data string 402 is an example, and may be structured in any manner deemed appropriate by the dual currency authority. For example, one or more of the fields shown may not be included, additional fields may be included, or the fields may be arranged differently than shown in data string 402.

Note that in the above described structure, many of the specific fields may be more informational rather than being essential for the operation of the dual currency system. For example, while the face value field, or a representation of the face value, may be essential for the operation of the dual currency system, issuer identity, user's driver license etc., may not be essential. Additionally, even if included, it is expected that the encoding of information such as payee identity etc., would conform to privacy laws, standards, etc, as needed and/or desired.

Encoding of information within dual currency note content provides the dual currency authority with desirable flexibility. For example, if the dual currency authority is the U.S. government, then consistent with current U.S. anti-money-laundering policy that requires reporting of transactions exceeding $10,000, the dual currency authority may be configured to require driver's license numbers if and only if the face value of a dual currency note content exceeds $10,000. Further, if the political process later determines that only notes exceeding $50,000 require reporting, the dual currency authority can be easily reconfigured to implement the change.

Because the face value of the note is carried as a field in the note itself, embodiments are not restricted to issuing notes in a limited set of predefined denominations (e.g., predefined set of denominations for US currency such as cent, nickel, dime, quarter, dollar, two-dollar, five-dollar, ten-dollar, fifty-dollar, hundred-dollar), and, in some embodiments, may encode each note individually with a precise face value (e.g. the face value amount required for a particular transaction). The face value of a dual currency note may be specified with a high level of precision. For example, with the U.S. Dollars system one one-hundredth of a dollar (one cent) is the minimum amount of value that a note (or coin) may carry, however with a dual currency system, notes of values as small as a thousandth, or a millionth, of a dollar may be created and used. Estimations of current technology (internet costs of transmission, processing costs, etc.) suggest that notes of value of as little as one ten thousandths of a dollar (one hundredth of a cent) may be created and processed at a profit. The flexibility in the level of precision may, for example, allow for the dual currency to be efficiently used in various micropayment applications.

Data string 402 may be provided as input to dual currency content to note translator 410. A cryptographic process applies the dual currency secret key 412 to the dual currency note content 402 in order to output the corresponding dual currency note 404. Data string 404 may be provided as input to dual currency note to content translator 414. A cryptographic process applies the dual currency public key 416 to the dual currency note 404 in order to output the corresponding dual currency note content 402. The dual currency note pair 406 comprises two strings. The first is the dual currency note content 402 and the second is the dual currency note 404. The first and the second are related by application of the secret and public keys as performed by the dual currency note to content translator and the dual currency content to note translator.

Figure 5:
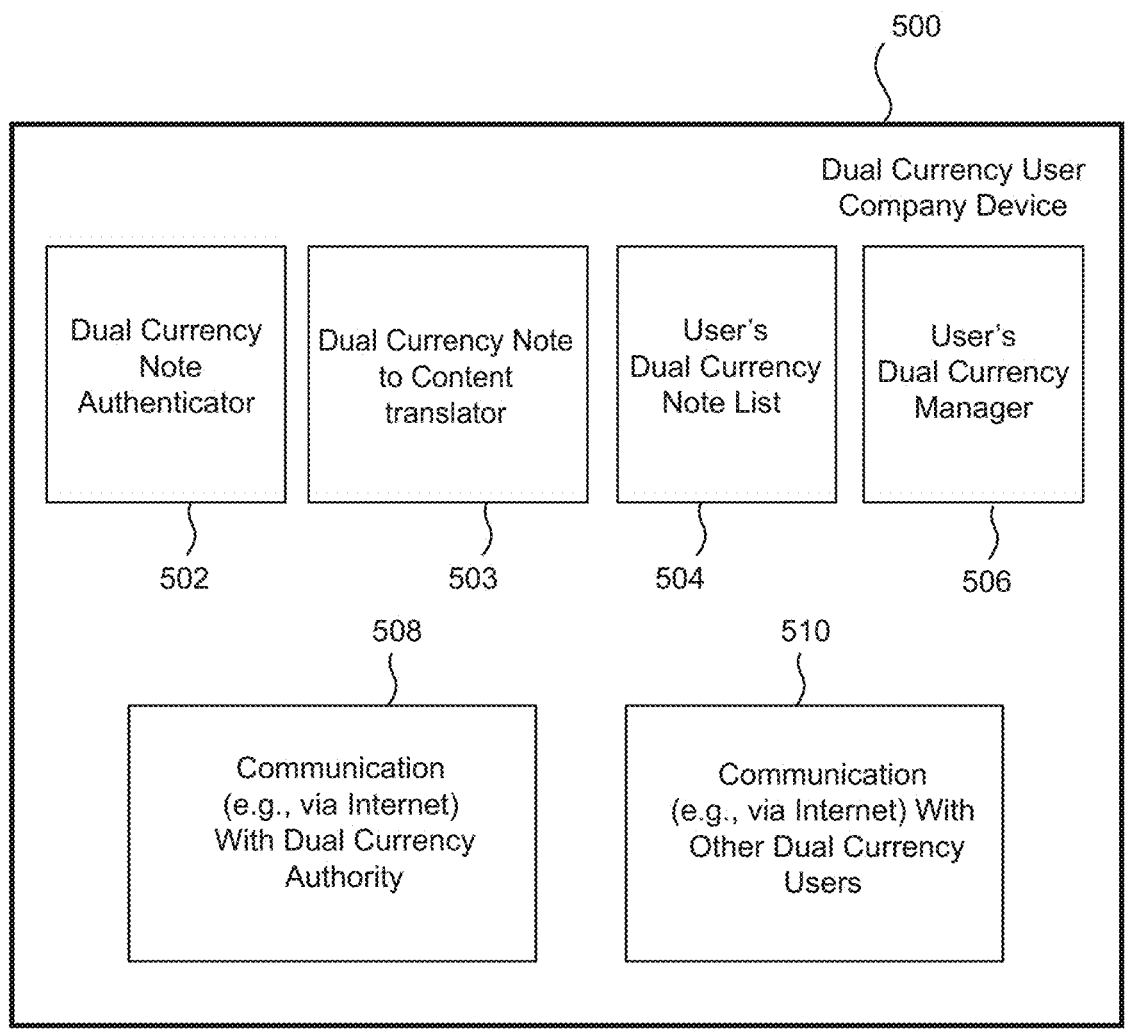
FIG. 5 illustrates some components of a specially configured computing device or system that is associated with a dual currency user, in accordance with one or more embodiments.

FIG. 5 illustrates some system components of a dual currency user computing device 500 according to one or more first embodiments. The system functional components include a dual currency note authenticator 502, a dual currency note to content translator 503, a user's dual currency note list 504, a user's dual currency manager 506, and communication interface 508 for communicating with the dual currency authority and communication interface 510 for communicating with other dual currency users. For example, system 500 may include one or more server computers, desktop computers, laptop or notebook computers, tablets, smartphones, wearable computing device, etc., such as, for example, computer 200 and/or computer 220.

Dual currency note authenticator 502, like dual currency note authenticator 320, operates to take an input and determine whether the input is an authentic dual currency note (i.e. a dual currency note which has been created by the authority and has not been destroyed by the authority) or is not an authentic dual currency note. An example authentication process is described below in relation to FIG. 11.

Dual currency note to content translator 503, like dual currency note to content translator 314, operates to translate a dual currency note to its corresponding dual currency note content. An example dual currency note to content translator process is shown in FIG. 7B.

The user's dual currency note list 504 operates to identify each dual currency note currently possessed by the user. In some embodiments the user's dual currency list 504 may be stored in a secure fashion such as in encrypted form. The user's dual currency note list 504 may be stored in a volatile memory and/or non-volatile memory.

The user's dual currency manager 506 operates to send and/or receive dual currency notes and to update the user's dual currency note list 504. For example, depending on whether the user is operating as a payer or payee in a particular transaction, manager 506 may either send dual currency notes (e.g. as payment) or receive a dual currency note (e.g. as payment) and accordingly update the user's dual currency note list 504. The dual currency manager 506 may also operate to provide functions appropriate to the user or the user's environment, for example, maintaining a balance, maintaining a transaction history, making automatic payments, providing security (e.g. encryption) for the user's dual currency list. The dual currency manager 506 may call the dual currency note to content translator 503 and/or the dual currency note authenticator 502.

According to an embodiment, dual currency manager 506 may be a plug-in or other component that operates within the context of a browser. In another embodiment, dual currency manager 506 may be a standalone application or app.

Communication interfaces 508 and 510 provide for communicating with, respectively, the dual currency authority and other dual currency users. The communication may be, for example, over the internet or other network. The communication interfaces 508 and 510 may make use of browsers to communicate with web servers, or the like (e.g. when a user is shopping online and visits the web site of another user engaged in online commerce). Communication interface 508 may include operations associated with the communication links 114 and 118 shown in FIG. 1 and communication links 1448 and 1444 shown in FIG. 14. Communication interface 510 may include operations associated with the communication links 116 shown in FIG. 1 and communication links 1446 shown in FIG. 14.

FIG. 6 is a flowchart illustrating a machine-implemented method 600 for initializing a dual currency system, in accordance with one or more embodiments. Those in the art will appreciate that the successive blocks in FIG. 6 represent modules of computer program code structure which, when executed, effect particular pre-determined functions. Method 600 may be performed, for example, by dual currency authority 102 or 1432. It will be understood that, in some embodiments, one or more of the operations 604-612 may not be performed, or may be performed in an order different from that shown, when performing method 600.

After entering dual currency initialization at 602, the method proceeds to choose a cryptosystem at operation 604. Choices for cryptosystems may include, for example, and without limitation, public key cryptosystems such as RSA, Elliptic Curve Cryptosystem (ECC), El Gamal encryption, and digital signature cryptosystems, such as, digital signature algorithm (DSA), elliptic curve digital signature algorithm (ECDSA), El Gamal signature system, Schnorr signature algorithm, Rabin signature algorithm, GMR (Goldwasser-Micali-Rivest) signature algorithm, Pointcheval-Stern signature algorithm, Chaum's undeniable signatures, pairing based digital signature schemes, Merkle signature scheme, BLS (Boneh-Lynn-Shacham) based digital signature scheme, and others. The following examples are based upon choosing the RSA public key cryptosystem or the El Gamal signature system, but the selection of other cryptosystems, such as, for example, those listed above, are contemplated to be used in other embodiments.

At operation 606, keys for use in the dual currency system are generated. In the RSA public key cryptosystem example embodiment, a key pair, i.e. a secret key and a public key, is generated using the RSA technique. U.S. Pat. No. 4,405,829 to Rivest, Shamir and Adleman (the latter being the inventor of the subject matter of this application) describes the RSA technique in detail, and is hereby incorporated by reference in its entirety. In the El Gamal signature system example embodiment, a key pair, i.e. a secret key and a public key, is generated using the El Gamal technique.

At operation 606 the length of the keys to be used in the dual currency system may be selected, and this may determine the length of dual currency note content. For example, in an example embodiment, the choice may have been to use 2048-bit RSA keys which then would suggest that a dual currency note content be a 2048-bit string. The keys and their length should be selected to meet the security requirements of the authority.

At operation 608, a destroyed note list is initialized. As described above, the destroyed note list may include an entry for each dual currency note that has been destroyed (e.g. removed from circulation) by the dual currency authority. Initialization includes setting up the destroyed note list so that entries can be added during operation of the dual currency system. According to an embodiment, the destroyed note list may be set up at operation 608 as an empty list.

At operation 610, a created note list is initialized. As described above, the created note list may include an entry for each dual currency note that has been created (e.g. added to circulation) by the dual currency authority. Initialization includes setting up the created note list so that entries can be added during operation of the dual currency system. According to an embodiment, the created note list may be set up at operation 610 as an empty list.

At operation 612, the public key, the destroyed note list, and the created note list are made available to the public. According to some embodiments, the public key may be published by broadcasting it to all known users. In another embodiment, publishing the public key involves depositing the key in a manner that it can be accessed by any user. For example, the key may be stored in a web server or FTP server such that it may be provided to any entity upon the receipt of a request. The destroyed note list and the created note list may be publicized by enabling users to access the lists, for example, by storing in a web server or FTP server such that they may be provided to any entity upon the receipt of a request.

FIG. 7A is a flowchart illustrating a machine-implemented method 700 for translating a dual currency note content to a dual currency note. Those in the art will appreciate that the successive blocks in FIG. 7A represent modules of computer program code structure which, when executed, effect particular pre-determined functions.

After entering the method at operation 702, at operation 704, a dual currency note content g is received as input (e.g. from some other process such as shown in FIG. 8).

At operation 706, the secret key is applied to the dual currency note content g determined at operation 704 in order to produce a dual currency note. According to the primary example embodiment, the secret key is applied to the dual currency note g by applying a cryptographic process (e.g. encryption, decryption, signing) to the dual currency note content g and the secret key. For example, if the RSA public key cryptosystem is used for the dual currency, and the public key is <E, N> and secret key is <D, N>, then operation 706 consists of treating the dual currency note content g determined at operation 704 as a number G between 0 and N−1, and computing the number C which is the least non-negative residue of $G^D$ Mod(N). The number C is then treated as a string c which is the dual currency note generated in operation 706, Note that treating strings such as dual currency note contents and dual currency notes as numbers can be done using any standard system, for example, treating strings as the binary representations of numbers.

For example, if the El Gamal signature system (a description of the El Gamal signature system is available at http://en.wikipedia.org/wiki/ElGamal_signature_scheme) is used for the dual currency, and the public key is <p,w,y> and the secret key is x, then operation 706 consists of treating the dual currency note content g determined at operation 704 as a number G between 0 and p−1, choosing a random K such that 1<K<p−1 and gcd(K, p−1)=1, computing the least positive residue R of $w^K$ Mod(p), computing the least positive residue S of $(G-xR)K^{-1}$ MOD(p−1). If S=0 starting over again. If S is not equal to 0, then encoding the triple of numbers (R,S,G) as a string c which is the dual currency note generated in operation 706. Note that treating strings as triples of numbers can be done using any standard system.

In some dual currency systems, at operation 706, rather than applying the secret key to the dual currency note content, the secret key is applied to a hash or digest of the dual currency note content.

At operation 708, the dual currency note c determined at operation 706 is output.

FIG. 7B is a flowchart illustrating a machine-implemented method 720 for translating a dual currency note to a dual currency note content. Those in the art will appreciate that the successive blocks in FIG. 7B represent modules of computer program code structure which, when executed, effect particular pre-determined functions.

After entering the method at operation 722, at operation 724, a dual currency note c is received as input (e.g. from some other process such as that shown in FIG. 9, FIG. 12A, FIG. 12B).

At operation 726, the public key of the dual currency is applied to the dual currency note c determined at operation 724 in order to produce a dual currency note content. For example, if the RSA public key cryptosystem is used for the dual currency, and the public key is <E, N> and secret key is <D, N>, then operation 726 consists of treating the dual currency note c determined at operation 724 as a number C between 0 and N−1, and compute the number G which is the least non-negative residue of $C^E$ Mod(N). The number G is then treated as a string g which is the dual currency note content generated in operation 726. Note that if the input determined at operation 724 is a dual currency note, then by the properties of the RSA system, it must be the case that C is between 0 and N−1. Hence, if it is not the case that C is between 0 and N−1, then the input was not a dual currency note.

For example, if the El Gamal signature system is used for the dual currency, and the public key is <p,w,y> and the secret key is x, then operation 726 consists of treating the dual currency note c determined at operation 724 as a triple of numbers (R,S,G), confirming that 0<R<p and 0<S<p−1 and $w^G \equiv y^R R^S$ MOD(p) and then treating the number G as a string g which is the dual currency note content generated in operation 726. Note that if the input determined at operation 724 is a dual currency note, then by the properties of the El Gamal Signature system it must be the case that [0<R<p and 0<S<p−1 and $w^G \equiv y^R R^S$ MOD(p)]. Hence, if it is not the case that [0<R<p and 0<S<p−1 and $w^G \equiv y^R R^S$ MOD(p)], then the input was not a dual currency note.

At operation 728, the dual currency note content g determined at operation 726 is output.

FIG. 8 is a flowchart illustrating a machine-implemented method 800 for creating a dual currency note, in accordance with one or more embodiments. Those in the art will appreciate that the successive blocks in FIG. 8 represent modules of computer program code structure which, when executed, effect particular pre-determined functions. Method 800 may be performed, for example, by dual currency authority 102 or 1432. It will be understood that, in some embodiments, one or more of the operations 804-812 may not be performed, or may be performed in an order different from that shown, when performing method 800.

After entering dual currency note creator at 802, operation 804 receives, as input, information for the note to be created (e.g. face value) For example, if the dual currency authority is operating as an agent of an entity (e.g. company, government) that pays employee salaries by sending dual currency notes to them, then this entity may provide monthly lists of parameters appropriate to each employee (e.g. monthly salary, address to which notes are to be sent); using these parameters, the dual currency authority may derive the information (e.g. address to which notes are to be sent, face value (e.g. equal to monthly salary)) to be used as input to the dual currency distributor (FIG. 10), which then calls the dual currency creator with the information (e.g. face value) of the dual currency note (or notes) required. In another example, the dual currency note creator may be called by the dual currency replacer (shown, for example, in FIGS. 12A and 12B) as a result of a dual currency replacement request.

For example, the input may determined that a note with a face value of v is required, and further that the note should have the driver's license number, A246810, of the user for whom the note is being created. In some embodiments, the input parameters may specify any combination of the fields that are defined for the dual currency note content.

At operation 806, a dual currency note content is generated in accordance with the input information received in operation 804.

At operation 808, the newly generated dual currency note content may be added to the dual currency created list. In some embodiments, additional information associated with the newly created dual currency note content (e.g. the name of the specific computing device used to create the note), may also be added to the created note list.

At operation 810, the dual currency note content is given as input to the dual currency content to note translator (see FIG. 7A) which applies the secret key and returns the corresponding dual currency note.

At operation 812, the dual currency note generated at operation 810 is output.

FIG. 9 is a flowchart illustrating a method 900 for destroying dual currency notes, in accordance with one or more embodiments. Those in the art will appreciate that the successive blocks in FIG. 9 represent modules of computer program code structure which, when executed, effect particular pre-determined functions. Method 900 may be performed, for example, by dual currency authority 102, 1432. It will be understood that, in some embodiments, one or more of the operations 904-908 may not be performed, or may be performed in an order different from that shown, when performing method 900.

After entering the method at 902, at operation 904, a dual currency note c, which is to be destroyed, is received as input For example, if the dual currency authority is operating as an agent of an entity (e.g. company, government) that regulates the money supply by the occasional destruction of notes, then this entity may provide a list of dual currency notes to be destroyed; these become inputs to the dual currency note distributor.

At operation 906, the dual currency note to content translator (FIG. 7A) is called with input c. The dual currency note to content translator returns the content g of the note c.

At operation 908, the content g determined at operation 906 is added to the destroyed note list. In embodiments where the destroyed notes list consists of notes themselves, then c is added to the destroyed notes list.

After a note is destroyed using method 900, the note (or its content) is now on the destroyed note list and if the note is input to the dual currency authenticator, the output will be that the note is not authentic. In particular, if the note is tendered in a dual currency replacement request, the replacement request will be rejected; hence the note cannot be used as payment during a dual currency replacement.

FIG. 10 is a flowchart illustrating a machine-implemented method 1000 for dual currency distribution in accordance with one or more embodiments. Those in the art will appreciate that the successive blocks in FIG. 10 represent modules of computer program code structure which, when executed, effect particular pre-determined functions.

After entering the method at 1002, at operation 1004, information for the distribution (e.g. face value of dual currency note to be distributed, address of user where the dual currency note is to be sent, driver's license number of user to whom the dual currency note is to be sent) is received as input.

For example, if the dual currency authority is operating as an agent of an entity (e.g. company, government) that pays employee salaries by sending dual currency notes to them, then this entity may provide the dual currency authority monthly lists of parameters appropriate to each employee (e.g. monthly salary, address to which notes are to be sent); using these parameters, the dual currency authority may derive the information (e.g. address to which notes are to be sent, face value (e.g. equal to monthly salary)) to be used as input to the dual currency distributor.

At operation 1006, dual currency note creator (e.g., FIG. 8) is called with information for the note to be created as input, and a newly created dual currency note is received as output.

At operation 1008 the dual currency note determined at operation 1006 is sent to the user.

Figure 11:
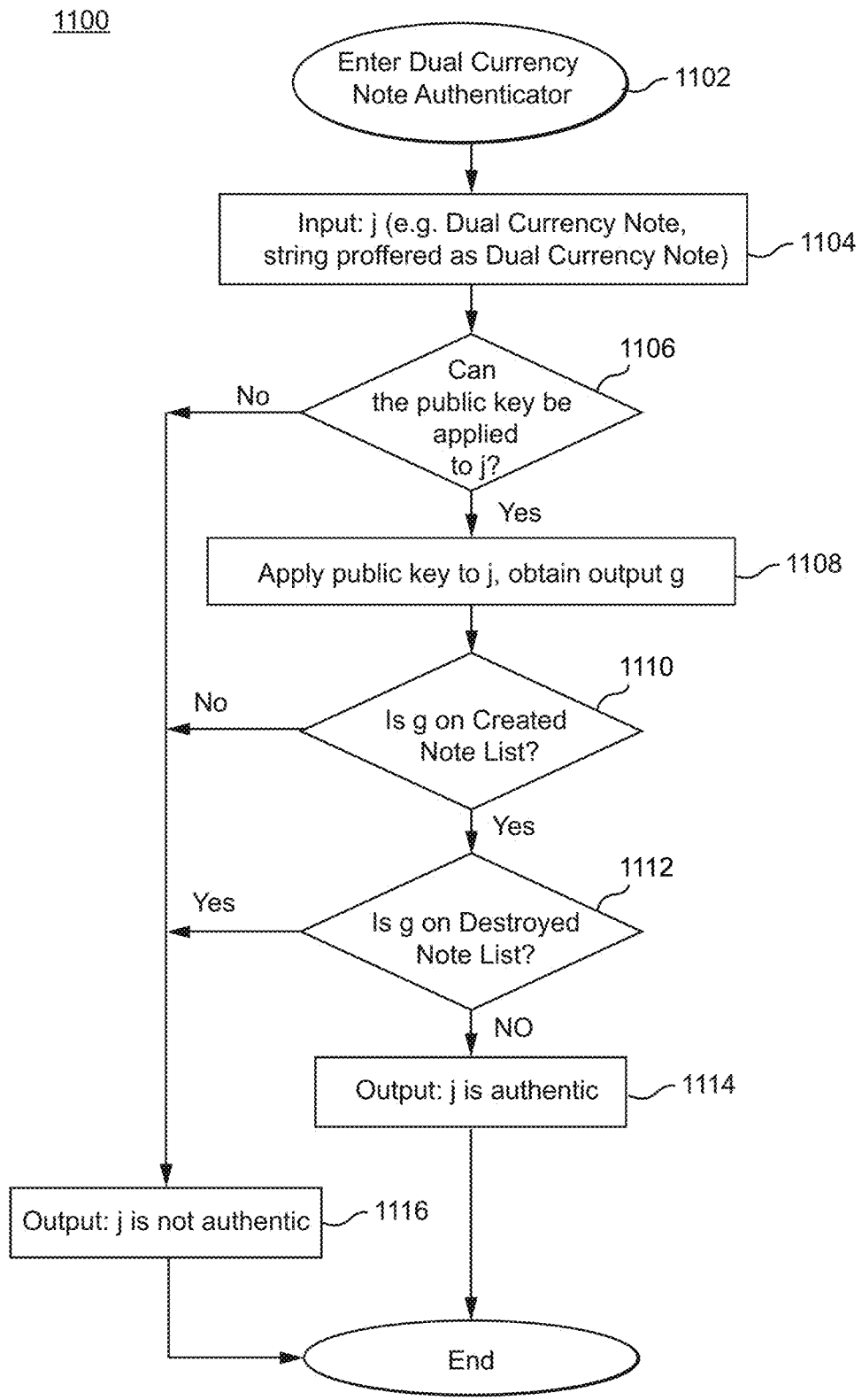
FIG. 11 is a flowchart illustrating a machine-implemented method for authenticating a dual currency note, in accordance with one or more embodiments.

FIG. 11 is a flowchart illustrating a machine-implemented method 1100 for authenticating a dual currency note, in accordance with one or more embodiments. Those in the art will appreciate that the successive blocks in FIG. 11 represent modules of computer program code structure which, when executed, effect particular pre-determined functions. It will be understood that, in some embodiments, one or more of the operations 1102-1116 may not be performed, or may be performed in an order different from that shown, when performing method 1100.

At operation 1102, the process for authenticating a dual currency note is entered.

At operation 1104 an input j (e.g. a dual currency note or a string proffered as a dual currency note) is received.

At operation 1106, it is determined if the public key can be applied to the input j determined at operation 1102. For example, if the RSA public key cryptosystem is used for the dual currency, and the public key is <E, N> and secret key is <D, N>, then operation 1106 may treat j as number J and determine if $0 \leq J \leq N-1$. If it is not the case that $0 \leq J \leq N-1$, then operation 1106 produces output: No. If it is the case that $0 \leq J \leq N-1$ then operation 1106 produces output: Yes. For example, if the El Gamal signature system is used for the dual currency, and the public key is <p,w,y> and the secret key is x, then operation 1106 may treat j as a triple of numbers (R,S,G) and determine if $0<R<p$ and $0<S<p-1$ and $0<G<p-1$ and $w^G \equiv y^R R^S \text{ MOD}(p)$. If it is not the case that $0<R<p$ and $0<S<p-1$ and $0<G<p-1$ and $w^G \equiv y^R R^S \text{ MOD}(p)$, then operation 1106 produces output: No. If it is the case that $0<R<p$ and $0<S<p-1$ and $0<G<p-1$ and $w^G \equiv y^R R^S \text{ MOD}(p)$, then operation 1106 produces output: Yes.

At operation 1108, the public key is applied to the input j determined at operation 1102. For example, if the RSA public key cryptosystem is used for the dual currency, and the public key is <E, N> and secret key is <D, N>, then operation 1108 may treat j as number J and compute the number G which is the least non-negative residue of $J^E$ Mod(N) and outputting the string g that when treated as a number is G. For example, if the El Gamal signature system is used for the dual currency, and the public key is <p,w,y> and the secret key is x, then operation 1108 may output the string g that when treated as a number is G.

At operation 1110, it is determined whether the string g determined at operation 1108 is on the created notes list. If the string g determined at operation 1108 is on the created notes list, then operation 1110 produces output: Yes. If the string g determined at operation 1108 is not on the created notes list, then operation 1110 produces output: No. In embodiments where the created note list is not made public or is not kept by the dual currency authority, then the string g determined at operation 1108 may be checked to determine if it has the structure required of a dual currency note content (e.g. the correct fixed fields and appropriate variable fields). If the string g determined at operation 1108 has the structure required of a dual currency note content, then operation 1110 produces output: Yes. If the string g determined at operation 1108 does not have the structure required of a dual currency note content, then operation 1110 produces output: No.

At operation 1112, it is determined whether the string g determined at operation 1108 is on the destroyed notes list. If the string g determined at operation 1108 is on the destroyed notes list, then operation 1110 produces output: Yes. If the string g determined at operation 1108 is not on the destroyed notes list, then operation 1110 produces output: No.

At operation 1114 (if reached), method 1100 for authenticating a dual currency note outputs: j is an authentic note, indicating that j is an authentic dual currency note.

At operation 1116 (if reached), method 1100 for authenticating a dual currency note outputs: j is not an authentic note, indicating that j is not an authentic dual currency note.

If input j is deemed, by method 1100 for authenticating a dual currency note, to be authentic, then the possessor of that note (e.g. a merchant who has accepted in as payment) may be sure that he holds a dual currency note deemed by the dual currency authority to have value. He may use the dual currency note to content translator to determine the notes corresponding dual currency note content and hence the notes face value and other features. For example, when the dual currency system is based upon the RSA cryptosystem and the note is successfully authenticated, properties of the RSA algorithm guarantee that the dual currency note is indeed associated with a corresponding notes dual currency content and properties of the authentication process guarantees that the note has value.

In some embodiments, dual currency authentication is performed using information (e.g. the public key, destroyed note list, and the created note list) that is available to all users. In such embodiments, dual currency authentication may be performed by the user without further assistance from the authority.

A dual currency note j which is authenticated by the dual currency authenticator is deemed by the dual currency authority to have value. However, this is no guarantee that there does not exist a duplication counterfeit copy of the note j. By the nature of computers, such duplication counterfeits are easy to make and are indistinguishable from the original. For example, if a user as payee (e.g. merchant) accepts a dual currency note j from another user as payer (e.g. a customer), then even if the user as payee authenticates note j by using the dual currency authenticator, he has no guarantee that the user as payer has not kept a copy of note j himself and now possess a duplication counterfeit. Both copies of note j are equally valuable (until, for example, one of the copies is tendered in a dual currency replacement operation).

The user as payee may indemnify himself against accepting notes for which duplication counterfeits exist, by using the dual currency replacer (see FIG. 12A and FIG. 12B) for transactions with users as payers. In this case, the user as payee submits a dual currency replacement request tendering note j and indicating that a new note is to be created and sent to the user as payee. As a result of the dual currency replacer operation, the note j is destroyed (e.g. it or its content are placed on the destroyed list) and will not pass subsequent dual currency authentications, on the other hand, the note the user as payee receives from the dual currency authority is newly created by the dual currency authority and enters circulation only when sent to the user as payee. Hence when received by the user as payee, no duplication counterfeit of the new note exists. Even if the user as payer keeps a copy of note j, it has been destroyed (e.g. placed on the destroyed list) during the replacement operation and is no longer deemed to have value.

The above example illustrates an important feature of the dual currency replacer: it is a central defense against duplication counterfeiting. Computers make duplication counterfeiting of digital currencies relatively easy, and the dual currency replacer is a novel defense against this problem. A robust defense against duplication counterfeiting is a necessity for a digital currency to gain wide acceptance. Since the dual currency replacement provides such value to the receivers of dual currency notes, it may be used very frequently. For example, if the dual currency is used as a fiat currency (e.g. a digital currency analogous to the U.S. Dollar), then payees (e.g. merchants) may generate billions of calls to the dual currency replacer each day. It is therefore important that the means (e.g. devices with capabilities) to do very high throughput dual currency replacement exist. Fortunately this high level of throughput is possible using currently available technology. Companies on the internet such as Google currently process more than 130 billion Internet transactions per day (see, e.g., http://en.wikipedia.org/wiki/Google_Public_DNS) and high-speed RSA chips can create billions of (e.g. 2048-bits) notes per day. Technological improvements in the future are likely to increase these numbers. Hence, a single company acting as dual currency authority can handle all of the transactions required by an economy as large as the United States. Further in such a high throughput system, the cost of processing a replacement using for example 2048-bit RSA may become very low (e.g., less than $1/1000$ of a cent, and this should fall in the future), which in turn should allow for the profitable processing of transactions as small or smaller than $1/1000$ of a cent. This in turn should enable a system of micro-payments to become a reality on the internet. Hence an entity such as a newspaper or other publisher of articles, could sell access to an article for as little as $1/1000$ of a cent and be paid in dual currency notes.

FIG. 12A is a flowchart illustrating a method 1200 for replacing a dual currency note, in accordance with one or more embodiments. Those in the art will appreciate that the successive blocks in FIG. 12A represent modules of computer program code structure which, when executed, effect particular pre-determined functions. Method 1200 may be initiated by, for example, a dual currency user 110, 112, 1440 or 1442. It will be understood that, in some embodiments, one or more of the operations 1204-1224 may not be performed, or may be performed in an order different from that shown, when performing method 1200.

At operation 1202, the process for dual currency note replacement is entered.

At operation 1204, a request to replace a dual currency note is received from user A (e.g., payer). In an example embodiment, the request to replace includes a string s proffered as a note (e.g. s may be an authentic dual currency note, s may not be an authentic dual currency note (e.g. an attempt to pass a counterfeit)), the address of a user B to be paid, the face value, w, of the note to be sent to user B, and the address of user A to whom change is to be sent.

At operation 1206, the proffered string s is sent as input to the dual currency authenticator (FIG. 11). If the proffered string s is determined to be not an authentic note, then at operation 1210, replacement is denied and user A and/or user B and/or the dual currency authority may be informed. If informed, the dual currency authority may initiate an investigation.

If the proffered note s is determined to be an authentic note, then at operation 1207, the note s is sent as input to the dual currency note to content translator and the corresponding dual currency note content g is returned.

At operation 1208, it is determined from dual currency note content g whether the face value v of note s is equal to or greater than the amount w which is to be paid to user B. This check is performed in order to ensure that the proffered note s is adequate to cover the amount to be paid. If the face value of note s is not adequate to cover the amount w to be paid to user B, then at operation 1210, replacement is denied and user A and/or user B and/or the dual currency authority may be informed. If informed, the dual currency authority may initiate an investigation.

If the face value v of s is adequate to cover the amount w to be paid to user B, then at operation 1212, the dual currency destroyer is called with note s (and hence note s ceases to be an authentic note).

At operation 1214, the dual currency note creator is called with a request to create a note with face value w. The dual currency note creator returns a note c1 with face value w. In some embodiments the dual currency note creator is called with a request to create a note with face value w and with additional information (e.g. driver's license of user B) to be part of the note content. At operation 1218, the new note c1 is sent to user B.

At operation 1220, the dual currency note creator is called with a request to create a note with face value v−w. The dual currency note creator returns a note c2 with face value v−w. In some embodiments the dual currency note creator is called with a request to create a note with face value w and with additional information (e.g. driver's license of user A) to be part of the note content. At operation 1224, new note c2 is sent to user A. Note that c2 has face value v−w and is in effect returning the change that remains after paying user B.

Thus, by operations 1204-1224, process 1200 enables user A to proffer a note s in order to pay user B some amount in a newly created dual currency note, and having the balance returned to user A in a newly created dual currency note.

A compelling feature of the replacement operation is that it allows the payee to receive a newly created dual currency note directly from the dual currency authority and so the payee is assured that the note he receives is authentic and not a duplication counterfeit. Since the payee is protected from denovo counterfeits by the properties of public-key cryptography and he is protected from duplication counterfeits by the replacement process, he is protected from counterfeiting. Whereas, if the payee does not insist on using dual currency replacement and proceeds to accept a note in payment having checked the note's authenticity and face-value, then both the payee and the payer have indistinguishable copies of the note and each can try to spend it; the first one who spends it via a dual currency replacement will then foreclose the other from ever spending it via a dual currency replacement.

A person skilled in the art will appreciate that, in some embodiments, the method 1200 can be used to "make change"—i.e., for a user to exchange a dual currency note that he/she currently possesses, for two or more dual currency notes of lower denominations.

FIG. 12B is a flowchart illustrating a method 1230 for replacing a plurality of dual currency notes, in accordance with one or more embodiments. Those in the art will appreciate that the successive blocks in FIG. 12B represent modules of computer program code structure which, when executed, effect particular pre-determined functions. Method 1230 may be called, for example, by a dual currency user 110, 112, 1440 and 1442. It will be understood that, in some embodiments, one or more of the operations 1234-1248 may not be performed, or may be performed in an order different from that shown, when performing method 1230.

At operation 1232, the process for dual currency note replacement is entered.

At operation 1234, a request to replace a plurality of dual currency notes is received from a user. In an example embodiment, the request to replace includes strings s1, s2, ..., sw proffered as notes (e.g. each of s1, s2, ..., sw may be an authentic dual currency note, or may not be an authentic dual currency note (e.g. an attempt to pass a counterfeit)), the addresses of users B1, B2, ..., Bb to be paid, and the faces value, v1, v2, ..., vb of the notes to be sent to users B1, B2, ..., Bb respectively.

At operation 1236, the proffered strings s1, s2, ..., sw are sent as inputs to the dual currency authenticator (FIG. 11). If any of the proffered strings s1, s2, ..., sw are determined to be not authentic, then at operation 1240, replacement is denied and user A and/or users B1, B2, ..., Bb and/or the dual currency authority may be informed. If informed, the dual currency authority may initiate an investigation.

If all of the proffered strings s1, s2, ..., sw are determined to be authentic, then at operation 1237, the notes s1, s2, ..., sw are sent as inputs to the dual currency note to content translator and the corresponding dual currency note contents g1, g2, ..., gw are returned.

At operation 1238, it is determined from dual currency note contents g1, g2, ..., gw whether the sum of the face values of note s1, s2, ..., sw (the total amount of the notes tendered) is equal to the sum of v1, v2, ..., vb (the total amount which is to be paid to users B1, B2, ..., Bb). This is check performed in order to ensure that the proffered notes s1, s2, ..., sw are adequate to cover the amount to be paid. If the sum of the face values of note s1, s2, ..., sw is not equal to the sum of v1, v2, ..., vb then at operation 1240, replacement is denied and user A and/or users B1, B2, ..., Bb and/or the dual currency authority may be informed. If informed, the dual currency authority may initiate an investigation. If the sum of the face values of note s1, s2, ..., sw is equal to the sum of v1, v2, ..., vb, then at operation 1242, the dual currency destroyer is called with notes s1, s2, ..., sw (and hence notes s1, s2, ..., sw cease to be authentic notes).

At operation 1244, the dual currency note creator is called with requests to create notes with face values v1, v2, ..., vb. The dual currency note creator returns notes c1, c2, ..., cb with face values v1, v2, ..., vb respectively. In some embodiments the dual currency note creator is called with requests to create notes with face value v1, v2, ..., vb and with additional information (e.g. driver's license of user B1, B2, ..., Bb) to be part of the note content.

At operation 1248, new notes c1, c2, ..., cb are sent to users B1, B2, ..., Bb respectively.

Thus, by operations 1234-1248, process 1230 enables a user A to proffer notes s1, s2, ..., sw in order to pay users B1, B2, ..., Bb some amount in newly created dual currency notes. In some embodiments User A may be among the users B1, B2, ..., Bb.

A compelling feature of the replacement operation is that it allows each payee to receive a newly created dual currency note directly from the dual currency authority and so the payee is assured that the note he receives is authentic and not a duplication counterfeit. Since the payee is protected from denovo counterfeits by the properties of public-key cryptography and he is protected from duplication counterfeits by the replacement process, he is protected from counterfeiting.

Figure 13:
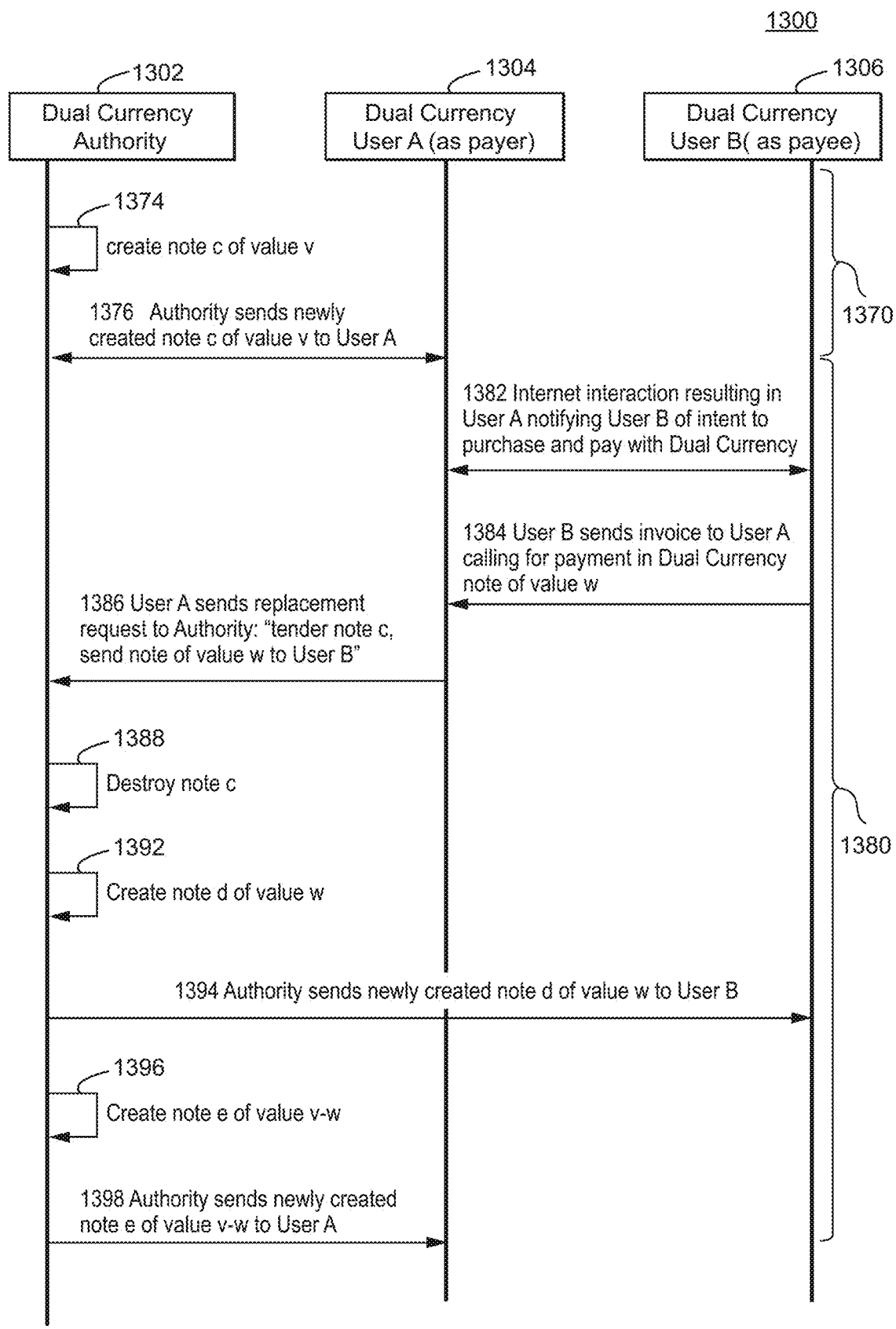
FIG. 13 is an activity chart illustrating interactions among specially configured computing device entities when a user receives a distribution of dual currency and when the user as payer pays a user as payee with the acquired dual currency note via a replacement request

FIG. 13 is an activity chart 1300 illustrating example interactions among entities in a dual currency system when a first user acquires a dual currency note from the authority, and when the first user, acting as a payer, pays a second user, acting as a payee, with the acquired dual currency note.

Activity chart 1300 illustrates sequences 1370 and 1380 between two or more of dual currency authority 1302, dual currency user A 1304 and dual currency user B 1306.

Activity sequence 1370 illustrates the creation of a dual currency note by the authority 1302 and the sending of the note to user A 1304. At operation 1374, the authority 1302 creates a note c of face value v. At operation 1376, the authority 1302 sends note c to user 1304.

In some embodiments, sequence 1370 may be initiated by the dual currency distributor (FIG. 10). For example, if the dual currency authority is operating as an agent of an entity (e.g. company, government) that pays employees, including user A 1304, salaries by sending dual currency notes to them, then this entity may provide the dual currency authority monthly lists of parameters appropriate to each employee, including user A 1304, (e.g. monthly salary, address to which notes are to be sent); using these parameters, the dual currency authority may derive the information (e.g. address to which notes are to be sent, face value (e.g. equal to monthly salary)) to be used as input to the dual currency distributor. The dual currency distributor will then create a dual currency note as in 1374 and send it to user A 1304 as in 1376.

In some embodiments, sequence 1370 may be initiated by the dual currency replacer (FIG. 12A, FIG. 12B). For example, if the user A 1304 has previously acted as a payee who has sold products and/or services to another user who has paid in dual currency via a replacement request, then the dual currency replacer will create a dual currency note as in 1374 and sent it to user A 1304 as in 1376.

Activity sequence 1380 illustrates an example of an online transaction wherein user A 1304, acting as payer, purchases goods and/or services from user B 1306, acting as payee, and user A 1304 uses a dual currency note to pay user B 1306. At operation 1382, user A 1304 and user B 1306 interact over the internet using a web portal operated by user B 1306. The interaction results in user A 1304 informing user B 1306 of intent to make a purchase and pay with a dual currency note. At operation 1384 user B 1306 sends user A 1304 an invoice indicating that the cost of the purchase will be a dual currency note of value w. At operation 1386 user A 1304 sends to the authority 1302 a replacement request: "tender note c, send user B a note of value w, send the change to user A". At operation 1388 the authority 1302 destroys note c (and places its content on the destroyed list). At operation 1392 the authority creates a new note d of face value w. At operation 1394 the authority sends the note d of face value w to user B 1306. At operation 1396 the authority creates a new note e of face value v–w. At operation 1398 the authority sends the note e of face value v–w to user A 1304.

According to another embodiment user B 1306 may accept note c from user A 1304 as direct payment without insisting on the use of the dual currency replacer. However, it will be noted that the replacement technique above provides properties and/or advantages that a direct transfer from payer to payee does not. For example, when a dual currency note is directly transferred from the payer to the payee, although the payee himself may authenticate the note by confirming that it is on the created list (or alternatively by using the public key to check that its corresponding content has the required structure) and by confirming that the note is not on the destroyed list, there is no guarantee that the payee has destroyed his original copy of the note c.

If the payee is not trustworthy and does keep a copy of note c, then the payee can immediately use note c to purchase new goods and/or services from a different user and if that purchase does employ a replacement request, then note c will be put on the destroyed list and this will preclude the original payee from using his copy of note c to acquire goods and/or services in a future transaction involving replacement. In contrast, when payment to the payee is through the replacement process discussed above, because the payee receives a newly created dual currency note directly from the authority, the payee can rely upon there being no other copies of that note.

However, the direct transfer technique may be preferable in some scenarios, such as when, for example, the use of the replacement technique is not an option (e.g., due to lack of network connectivity to the authority), when payer and/or payee requires anonymity regarding the transaction (e.g., to avoid the dual currency authority being involved in the transaction), when there is a high level of trust between the payee and the payer that the payer will destroy his copy of the dual currency note sent to the payee, and/or when the amounts involved are so small that duplication of notes and/or counterfeits are not a significant concern.

Figure 14:
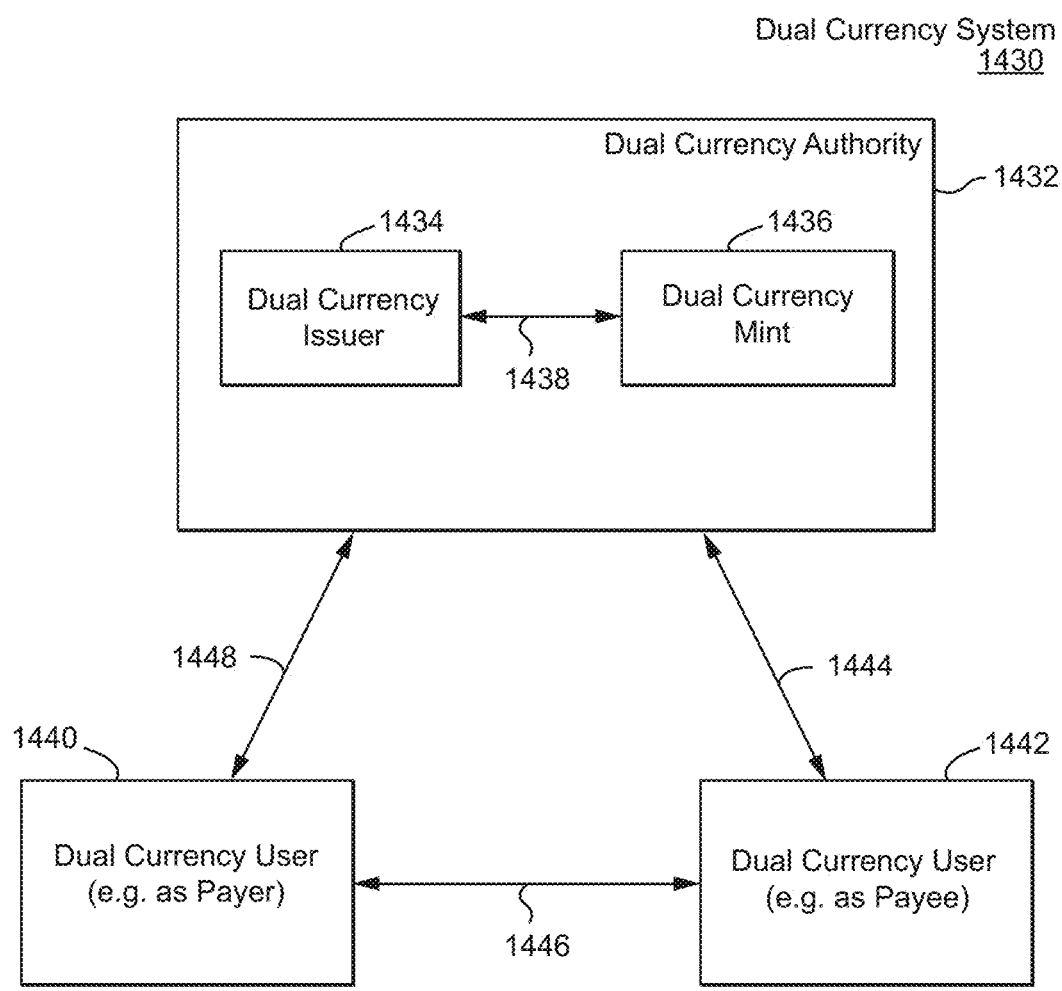
FIG. 14 is another high-level block diagram of a dual currency system of specially configured inter-communicating computing devices, in accordance with some embodiments.

FIG. 14 is a high-level block diagram of another dual currency system, in accordance with one or more second embodiments. Dual currency system 1430, like dual currency system 100 shown in FIG. 1, includes a dual currency authority 1432, a dual currency user 1440 and a dual currency user 1442 that interact in order to perform transactions. Here, the dual currency authority 1432 is represented by a dual currency issuer 1434 and a dual currency mint 1436. The dual currency issuer 1434 performs some of the functions of the dual currency authority and the dual currency mint 1436 performs some of the functions of the dual currency authority.

In one embodiment, the dual currency issuer 1434 performs at least some of the function of dual currency initializer 302 and the dual currency mint 1434 performs the remaining functions of the dual currency authority. For example, the dual currency issuer may be an institution such as a bank, or a government, or a machine operating as, or on behalf of, an institution, and the dual currency may be issued in the name (e.g. under its authority) of the institution. All notes of the dual currency are based upon a secret key known to issuer 1434. Dual currency mint 1436 represents the entity which performs the remaining functions of the dual currency authority including for example the actual creation, destruction, distribution, and replacement of dual currency notes. Mint 1436 may be, for example, a mint or other institution that has the resources and capacity (e.g., infrastructure, bandwidth, processing power) to generate notes, and perform high throughput replacement in a timely fashion. Mint 1436 may also be a machine operating as, or on behalf of such an institution.

Issuer 1434 and mint 1436 may exchange information via a communication medium 1438 (e.g., network connection) over which information can be electronically exchanged regarding cryptographic keys, data for creation of dual currency notes, information regarding dual currency notes, etc. For example, upon direction from issuer 1434, dual currency mint 1436 may create dual currency notes that are then distributed to users, such as, user 1442 and/or user 1440.

Communication links 1444, 1446, and 1448 provide for communication between dual currency authority 1432 and user 1440 and 1432 and user 1442, and between user 1442 and user 1440, respectively.

It will be appreciated that as used herein, the terms system, subsystem, service, logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A machine-implemented process enabling transactions using a dual currency, operations of said machine-implemented process being performed by at least one computing device of a note generating authority and said operations comprising:
   encrypting, with a secret key of the note generating authority, at least a portion of each of plural data strings to generate respectively corresponding notes of said dual currency, each of said notes having a respectively corresponding face value;
   transmitting at least some of said notes to computing devices external to the note generating authority;
   receiving, from a first user's computing device, a replacement-request including a first data string and a request for a computing device of the note generating authority to transmit to a second user's computing device, a new note of the dual currency;
   applying a single public key of the note generating authority to decrypt the first data string and produce a second data string;
   determining, based on the second data string, that the first data string is a note previously distributed by a computing device of the note generating authority to a computing device external to the note generating authority and is not a destroyed note in a list of destroyed notes maintained by a computing device of the note generating authority in a memory of the computing device;
   encrypting, with a secret key of the note generating authority, a third data string including the requested new note with a face value equal to or less than the face value of the received previously distributed note;
   adding the received previously distributed note to the list of destroyed notes; and
   transmitting the new note to the second user's computing device.

2. The machine-implemented process according to claim 1, wherein the portion of each said plural data strings corresponds to a respective note content including a respectively corresponding face value.

3. The machine-implemented process according to claim 1, the note content comprising at least one of
   (a) an identification of an issuer of the first note,
   (b) a sequence number,
   (c) an identification of a user, (d) a time associated with the date of the creation of the first note, and (e) a time when the first note expires.

4. The machine-implemented process according to claim 1, further comprising:

encrypting, with the secret key of the note generating authority, a fourth data string including another new note of the dual currency with a face value equal to the face value of the received previously distributed note minus the face value of the requested new note; and transmitting to the first user's computing device said another new note of the dual currency.

5. The machine-implemented process according to claim 1, wherein the secret key of the note generating authority and the public key of the note generating authority are a key pair of a public key cryptosystem.

6. The machine-implemented process according to claim 5, wherein the public key cryptosystem is an RSA (Rivest Shamir Adleman) cryptosystem.

7. The machine-implemented process according to claim 1, wherein the secret key of the note generating authority and the public key of the note generating authority are a key pair of a signature cryptosystem.

8. The machine-implemented process according to claim 1, wherein, for encrypting and/or decrypting data strings, the note generating authority uses at least one of:

(a) a public key cryptosystem,
(b) a digital signature cryptosystem,
(c) a Rivest Shamir Adlemen crypto system (RSA),
(d) Elliptic Curve Cryptosystem (ECC),
(e) El Gamal encryption,
(f) digital signature algorithm (DSA),
(g) elliptic curve digital signature algorithm (ECDSA),
(h) El Gamal signature algorithm,
(i) Schnorr signature algorithm,
(j) Rabin signature algorithm,
(k) GMR (Goldwasser-Micali-Rivest) signature algorithm,
(l) Pointcheval-Stern signature algorithm,
(m) Chaum's undeniable signatures,
(n) pairing based digital signature schemes,
(o) Merkle signature scheme, and
(p) BLS (Boneh-Lynn-Shacham) signature scheme.

9. A non-transitory computer readable medium storing computer program code structure comprising executable computer program instructions for enabling transactions using a dual currency for which notes are generated by a note generating authority, the computer program instruction which, when executed by at least one computing device processor of a computing device of the note generating authority, causes the computing device to:

encrypt, with a secret key of the note generating authority, at least a portion of each of plural data strings to generate respective notes of said dual currency, each of said notes having a respectively corresponding face value;

transmit at least some of said notes to computing devices external to the note generating authority;

receive from a first user's computing device a replacement-request including a first data string and a request for the note generating authority's computing device to transmit to a second user's computing device, a new note of the dual currency;

apply a single public key of the note generating authority to decrypt the first data string and produce a second data string;

determine, based on the second data string, that the first data string is a note previously distributed by a computing device of the note generating authority to a computing device external to the note generating authority and is not a destroyed note in a list of destroyed notes maintained by a computing device of the note generating authority in a memory of the computing device;

encrypt, with a secret key of the note generating authority, a third data string including the requested new note with a face value equal to or less than the face value of the received previously distributed note;

add the received previously distributed note to the list of destroyed notes; and transmit the new note to the second user's computing device.

10. A machine-implemented process enabling transactions using a dual currency, said machine-implemented process using at least one computing device of a note generating authority and comprising:

encrypting, with a secret key of the note generating authority, at least a portion of each of plural data strings to generate respectively corresponding notes of said dual currency, each of said notes having a respectively corresponding face value;

transmitting at least some of said notes to computing devices external to the note generating authority;

receiving, from a first user's computing device, a replacement-request including a first data string and a request for a computing device of the note generating authority to transmit to a second user's computing device, a new note of the dual currency ;

applying a single public key to decrypt the first data string and produce a second data string;

determining that the second data string is not found in a destroyed notes list maintained by a computing device of the note generating authority in a memory of the computing device;

encrypting, with a secret key of the note generating authority, a third data string including the requested new note with a face value equal to or less than the face value of the received first data string;

adding the received first data string to the list of destroyed notes; and transmitting the new note to the second user's computing device.

* * * * *